United States Patent
Okamoto

(10) Patent No.: US 8,576,484 B2
(45) Date of Patent: Nov. 5, 2013

(54) DISPLAY APPARATUS

(75) Inventor: Yoshiki Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 13/218,558

(22) Filed: Aug. 26, 2011

(65) Prior Publication Data

US 2012/0057228 A1 Mar. 8, 2012

(30) Foreign Application Priority Data

Sep. 2, 2010 (JP) ................................. 2010-196817

(51) Int. Cl.
*G02B 27/22* (2006.01)

(52) U.S. Cl.
USPC ......................................................... 359/462

(58) Field of Classification Search
USPC ........... 359/462, 466, 469, 473; 345/3.1, 6, 7, 345/9, 32; 348/42, 51, 739
See application file for complete search history.

(56) References Cited

U.S. PATENT DOCUMENTS

| | | |
|---|---|---|
| 2005/0052529 A1 | 3/2005 | Mashitani et al. |
| 2005/0134762 A1* | 6/2005 | Sung et al. .................... 349/96 |
| 2005/0280602 A1* | 12/2005 | Tzschoppe et al. ............ 345/3.1 |
| 2012/0056897 A1 | 3/2012 | Okamoto |
| 2012/0057108 A1 | 3/2012 | Okamoto |
| 2012/0057227 A1 | 3/2012 | Okamoto |

FOREIGN PATENT DOCUMENTS

| | | |
|---|---|---|
| JP | 3955002 | 5/2007 |
| JP | 4023626 | 10/2007 |

* cited by examiner

*Primary Examiner* — Alessandro Amari
*Assistant Examiner* — Jie Lei
(74) *Attorney, Agent, or Firm* — Wolf, Greenfield & Sacks, P.C.

(57) ABSTRACT

A display apparatus includes: a display unit in which sub-pixels are periodically arranged at a first sub-pixel pitch in a first direction of a screen, each pixel is formed by the plurality of sub-pixels, the pixels are periodically arranged at a first pixel pitch in the first direction, and a plurality of viewpoint images is displayed on a display surface; and a barrier unit in which transmissive sections having a first width in the first direction are periodically arranged. On the assumption that $p_{S1}$ is the first sub-pixel pitch, $p_{P1}$ is the first pixel pitch, $d_{PB}$ is a distance between the display surface of the display unit and the barrier section, and $\alpha$ and m (where m=0, 1, 2, ..., N−1 (where N is the number of plurality of viewpoint images)) are a constant greater than 0, the first width $w_{B1}$ is expressed by following expression;

$$w_{B1} = \left( \frac{\alpha}{p_{P1}^2} \cdot d_{PB} + m \right) \cdot p_{S1}.$$

12 Claims, 23 Drawing Sheets

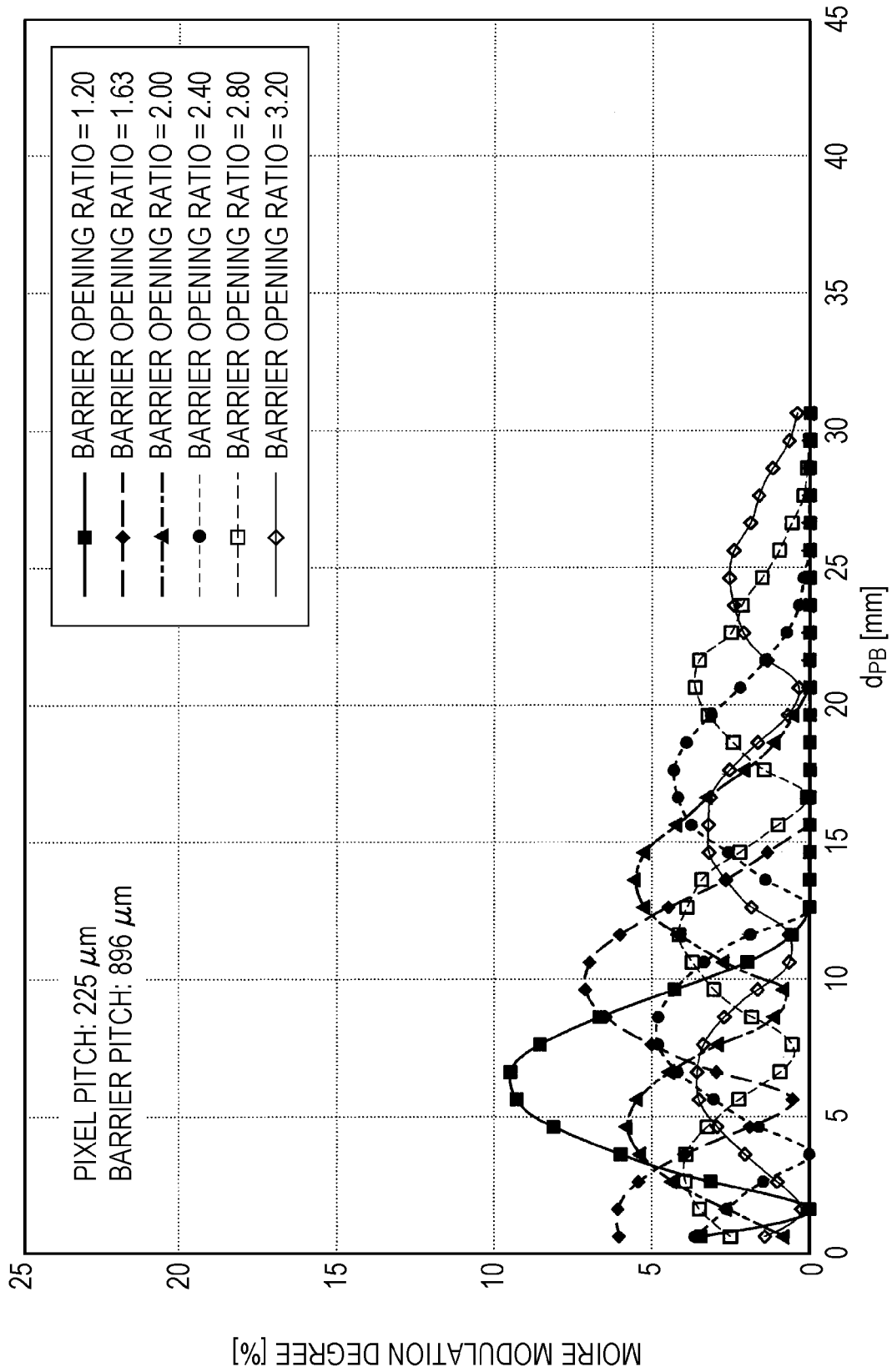

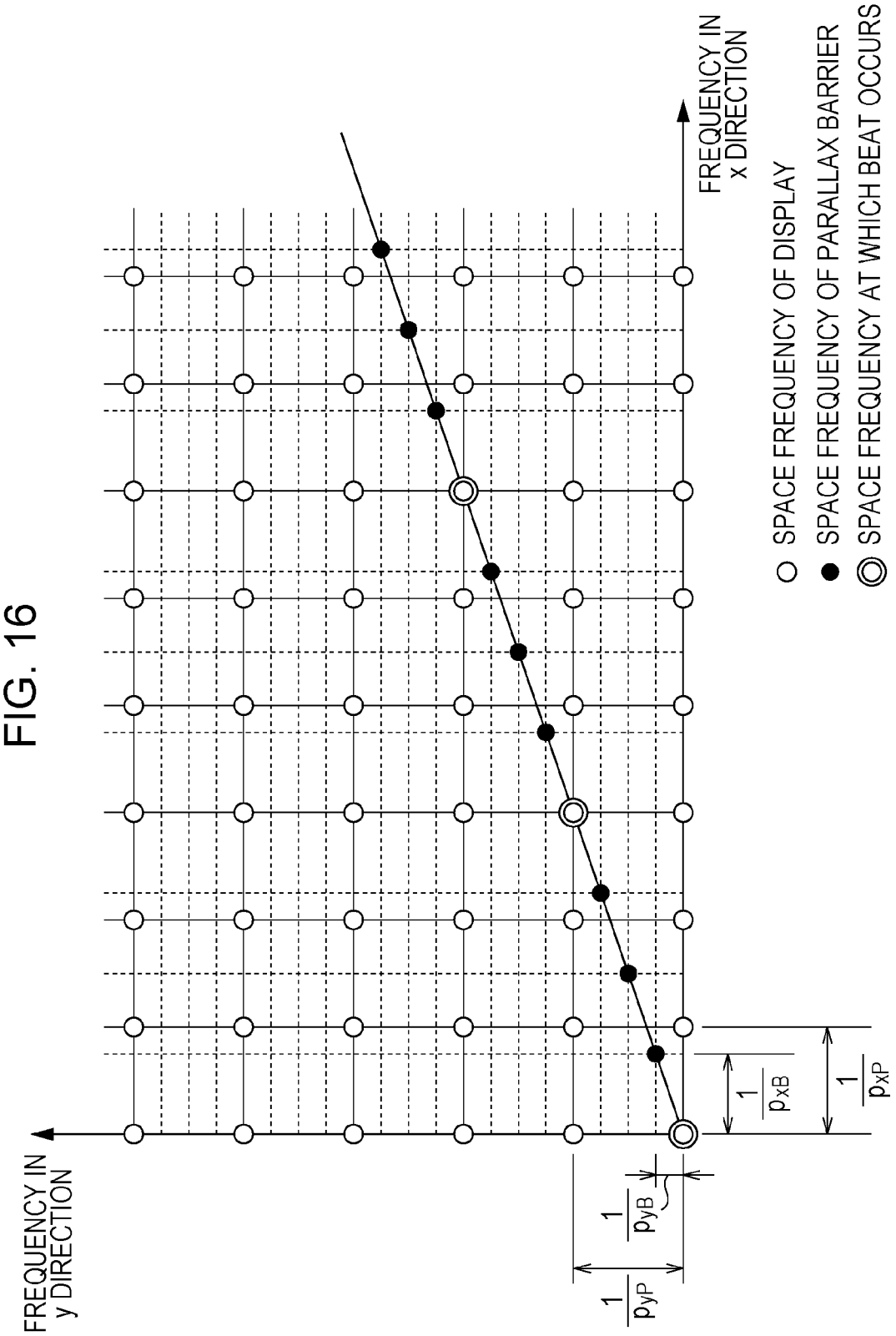

DISPLAY APPARATUS

BACKGROUND

The present disclosure relates to a display apparatus, and more particularly, to a display apparatus in which a barrier separates an image oriented toward a plurality of viewpoints.

A display apparatus has been developed in which a barrier a barrier including transmissive sections spatially separates an image oriented toward a plurality of viewpoints, so that images different in the respective viewpoints can be viewed. In such a display apparatus, the observer can view a stereoscopic image with his or her naked eyes by setting the plurality of viewpoints including the positions of the right and left eyes of the observer and reflecting a predetermined parallax between the image oriented toward the viewpoint at the position of the right eye and the image oriented toward the viewpoint at the position of the left eye. The barrier used in the display apparatus is particularly called a parallax barrier. Further, the display apparatus using the parallax barrier can also display a planar image, for example, by reflecting no parallax to the images oriented toward the plurality of viewpoints, that is, by displaying the same image at the plurality of viewpoints.

In the display apparatus in which the images oriented toward the plurality of viewpoints are periodically arranged to be displayed, luminance unevenness called moire is generated. The moire is observed as a striped pattern in an image and thus may give a sense of discomfort to an observer. For this reason, techniques for reducing the moire observed in an image have been devised. For example, Japanese Patent No. 4023626 discloses a technique for reducing the moire by allowing a proportion of the transmissive sections to be larger than a normal proportion in the barrier. Further, Japanese Patent No. 3955002 discloses a technique for reducing the moire by forming the transmissive sections of the barrier in an inclined stripe shape so that the width of the transmissive section is identical to a horizontal pixel pitch.

SUMMARY

In Japanese Patent No. 4023626, the proportion of the transmissive sections of the barrier is set to be 1.1 to 1.8 times the reciprocal of the number of viewpoints, but a process of deriving the proportion of the transmissive sections is not clarified. In Japanese Patent No. 3955002, the fact that the width of the transmissive section of the barrier is made to be identical to the horizontal pixel pitch is just described, but a process of deriving the width of the transmissive section is not described at all. The display apparatus has to be designed in consideration of various requirements as well as the reduction in the moire so as not to give a sense of discomfort or fatigue to an observer who views an image. Therefore, when attempts are made to reduce the moire by the above-mentioned techniques, a problem may arise in that flexibility in design of a display apparatus may deteriorate due to restriction on the configuration thereof.

It is desirable to provide a novel and improved display apparatus capable of reducing moire while ensuring flexibility in design in the configuration in which a barrier separates an image oriented toward a plurality of viewpoints.

According to an embodiment of the disclosure, there is provided a display apparatus including: a display unit in which sub-pixels are periodically arranged at a first sub-pixel pitch in a first direction of a screen, each pixel is formed by the plurality of sub-pixels, the pixels are periodically arranged at a first pixel pitch in the first direction, and a plurality of viewpoint images is displayed on a display surface; and a barrier unit in which transmissive sections having a first width in the first direction are periodically arranged. On the assumption that $p_{S1}$ is the first sub-pixel pitch, $p_{P1}$ is the first pixel pitch, $d_{PB}$ is a distance between the display surface of the display unit and the barrier section, and $\alpha$ and m (where m=0, 1, 2, ..., N−1 (where N is the number of plurality of viewpoint images)) are a constant greater than 0, the first width $w_{B1}$ is expressed by following expression;

$$w_{B1} = \left(\frac{\alpha}{p_{P1}^2} \cdot d_{PB} + m\right) \cdot p_{S1}$$

With such a configuration, the width of the transmissive section can be set so as to further reduce the moire by correcting the theoretical value in consideration of the behavior of the light waves observed in the display unit.

According to another embodiment of the disclosure, there is provided a display apparatus including: a display unit in which sub-pixels are periodically arranged at a first sub-pixel pitch in a first direction of a screen, each pixel is formed by the plurality of sub-pixels, the pixels are periodically arranged at a first pixel pitch in the first direction, and a plurality of viewpoint images is displayed on a display surface; and a barrier unit in which transmissive sections having a first width in the first direction are periodically arranged. On the assumption that $p_{S1}$ is the first sub-pixel pitch, $p_{P1}$ is the first pixel pitch, $d_{PB}$ is a distance between the display surface of the display unit and the barrier section, and $\alpha$ is a constant greater than 0, the first width $w_{B1}$ is set in a range expressed by following expression;

$$w_{B1} \leq \frac{\alpha}{p_{P1}^2} \cdot d_{PB} \cdot p_{S1}$$

The barrier section may be disposed in front of the display surface of the display unit.

The display apparatus may further include a light source. The barrier section may be disposed between the light source and the display unit.

The value of the constant $\alpha$ may be 0.0055.

The barrier section may be an inclined stripe barrier and the first direction may be perpendicular to an opening direction of the inclined stripe barrier.

The sub-pixels may be periodically arranged at a second sub-pixel pitch in a second direction of the screen. The pixels may be periodically arranged at a second pixel pitch in the second direction. The transmissive section may have a second width in the second direction. On the assumption that $p_{S2}$ is the second sub-pixel pitch, $p_{P2}$ is the second pixel pitch, $d_{PB}$ is a distance between the display surface of the display unit and the barrier section, and $\beta$ and n (where n=0, 1, 2, ..., N−1 (where N is the number of plurality of viewpoint images)) are a constant greater than 0, the second width $w_{B2}$ may be expressed by following expression;

$$w_{B2} = \left(\frac{\beta}{p_{P2}^2} \cdot d_{PB} + n\right) \cdot p_{S2}$$

The sub-pixels may be periodically arranged at a second sub-pixel pitch in a second direction of the screen. The pixels may be periodically arranged at a second pixel pitch in the second direction. The transmissive section may have a second width in the second direction. On the assumption that $p_{S2}$ is the second sub-pixel pitch, $p_{P2}$ is the second pixel pitch, $d_{PB}$ is a distance between the display surface of the display unit and the barrier section, and β is a constant greater than 0, the second width $w_{B2}$ may be set in a range expressed by following expression;

$$w_{B2} \le \frac{\beta}{p_{P2}^2} \cdot d_{PB} \cdot p_{S2}$$

The value of the constant β may be 0.0055.

The first direction may be a horizontal direction of the screen. The second direction may be a vertical direction of the screen. The barrier unit may be a step barrier in which the transmissive sections are arranged in a step shape.

A pixel opening section, which is an opening section of one of the plurality of sub-pixels that forms each pixel, may have a first pixel opening width in the first direction. The first pixel opening width may be set to be approximated to the first sub-pixel pitch.

A pixel opening section, which is an opening section of one of the plurality of sub-pixels that forms each pixel, may have a second pixel opening width in a second direction. The sub-pixels may be periodically arranged at a second sub-pixel pitch in the second direction. The second pixel opening width may be set to be approximated to the second sub-pixel pitch.

According to the embodiments of the disclosure, the display apparatus in which the barrier separates the image oriented toward the plurality of viewpoints can reduce the moire while ensuring the flexibility in design.

BRIEF DESCRIPTION OF THE DRAWINGS

FIG. 11B is a graph illustrating a relationship between the distance from the display to the parallax barrier and the moire modulation degree according to the first embodiment of the disclosure;

FIG. 16 is a diagram illustrating a combination of the frequencies of the light intensities in first and second directions according to the second embodiment of the disclosure.

DETAILED DESCRIPTION OF EMBODIMENTS

Figure 1:
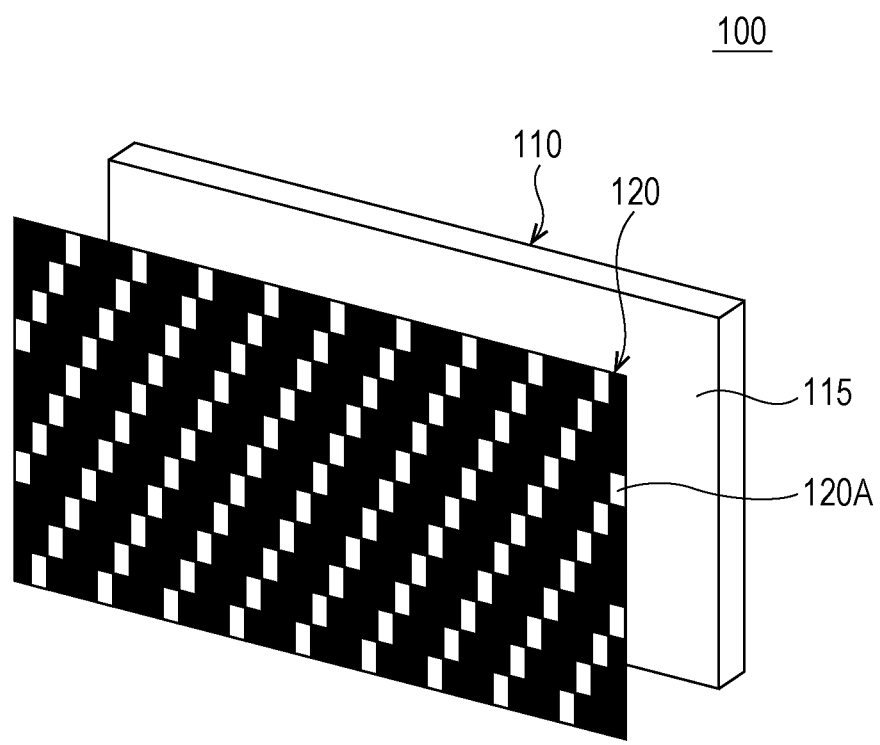
FIG. 1 is a diagram illustrating the overall configuration of a display apparatus according to a first embodiment of the disclosure.

Hereinafter, preferred embodiments of the disclosure will be described in detail with reference to the accompanying drawings. Throughout the specification and the drawings, the same reference numerals are given to constituent elements having substantially the same function and the description thereof will not be repeated.

The description will be made in the following order.
1. First Embodiment
1-1. Configuration of Display Apparatus
1-2. Light Intensity Distribution in Image
1-3. Cause to Generation of Moire
1-4. Design for Reducing Moire 2. First Embodiment
2-1. Configuration of Display Apparatus
2-2. Light Intensity Distribution in Image
2-3. Cause to Generation of Moire
2-4. Design for Reducing Moire
3. Supplement 1. First Embodiment First, a first embodiment of the disclosure will be described with reference to FIGS. 1 to 13.

1-1. Configuration of Display Apparatus

FIG. 1 is a diagram illustrating the overall configuration of a display apparatus 100 according to a first embodiment of the disclosure. As shown in FIG. 1, the display apparatus 100 includes a display 110 and a parallax barrier 120.

The display 110 is a display unit that displays N viewpoint images respectively oriented toward N viewpoints (where N is any plural number) using pixels having three sub-pixels. For example, the display 110 may be an LCD (Liquid Crystal Display), a PDP (Plasma Display Panel), an organic EL (Electro-Luminescence) panel, or the like.

The parallax barrier 120 is disposed in front of a display surface 115 of the display 110 or between a backlight of the display 110 and the display surface 115 at a predetermined interval from the display surface 115. The parallax barrier 120 includes transmissive sections 120A formed in a step shape in an inclination direction. The parallax barrier 120 transmits light from the display 110 through the transmissive sections 120A and blocks the light in the other portions. The transmissive sections 120A are arranged so as to conform with the arrangement of the image oriented toward the N viewpoints displayed in the display 110, so that the parallax barrier 120 separates the image oriented toward the N viewpoints for the viewpoint images, respectively.

Here, the parallax barrier 120 may be realized by displaying an image higher in the transmittance of light in portions corresponding to the transmissive sections 120A than in the other portions by the use of a transmissive liquid crystal display device. In this case, the transmissive sections 120A may not necessarily be physical opening sections. The transmittance of the light in the transmissive section 120A may not necessarily be 100% and may be higher than that the other portions.

Figure 2:
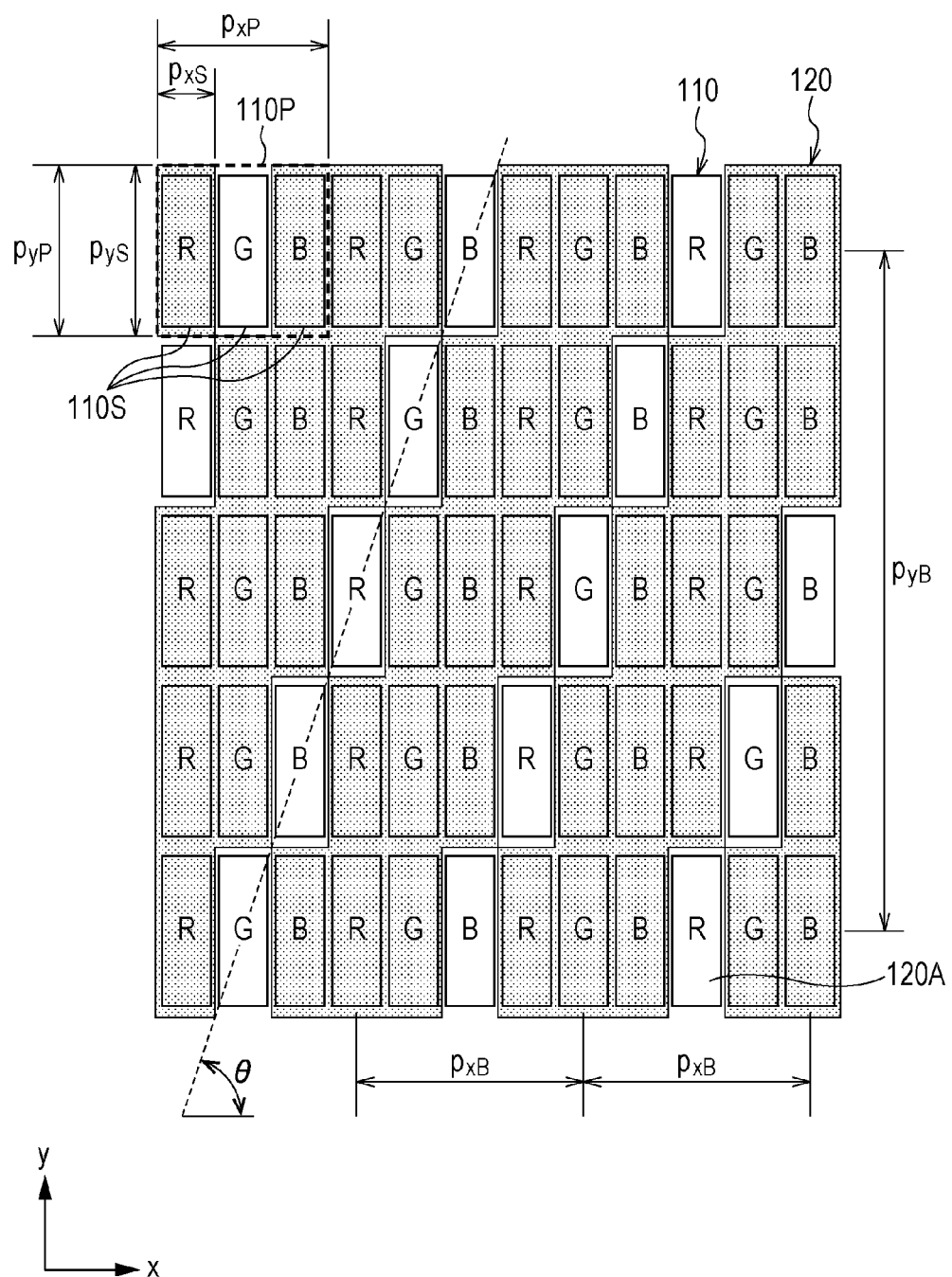
FIG. 2 is a schematic elevational view illustrating a display and a parallax barrier according to the first embodiment of the disclosure, when viewed from the side.

FIG. 2 is a schematic elevational view illustrating the display 110 and the parallax barrier 120 according to the first embodiment of the disclosure, when viewed from the side of the viewpoint. In the display 110, as shown in FIG. 2, sub-pixels 110S are periodically arranged. In this embodiment, a pixel 110P includes three sub-pixels 110S. The number of sub-pixels of the pixel may be plural and the embodiment of the disclosure is not limited to 3. In the parallax barrier 120, the transmissive sections 120A are periodically arranged. In this embodiment, the number of viewpoints N is 4.

The sub-pixels 110S are arranged at a first sub-pixel pitch $p_{xS}$ in an x-axis direction, which is a first direction of a screen, and are arranged at a second sub-pixel pitch $p_{yS}$ in a y-axis direction, which is a second direction of the screen. The sub-pixels 110S displaying three colors of R (red), G (green), and B (blue) are periodically arranged in the order of R, G, and B in the x-axis direction. The sub-pixels 110S displaying one of the three colors of R, G, and B are periodically arranged in the y-axis direction.

The pixel 110P includes three sub-pixels 110S displaying three colors of R, G, and B, respectively. The pixels 110P are arranged at a first pixel pitch $p_{xP}$ in the x-axis direction and are arranged at a second pixel pitch $p_{yP}$ in the y-axis direction. Here, since the pixel 110P includes the three sub-pixels 110S arranged in the x-axis direction, the first pixel pitch $p_{xP}$ and the first sub-pixel pitch $p_{xS}$ satisfy a relationship expressed by Expression (1).

$$p_{xS} = \frac{p_{xP}}{3} \tag{1}$$

Further, the second pixel pitch $p_{yP}$ and the second sub-pixel pitch $p_{yS}$ satisfy a relationship expressed by Expression (2).

$$p_{yS} = p_{yP} \tag{2}$$

The transmissive sections 120A are periodically arranged in the parallax barrier 120 and have a substantially similar shape to that of the sub-pixel 110S. In the first embodiment, the parallax barrier 120 is a kind of barrier called a step barrier, in which the transmissive sections 120A with a step shape are arranged in the inclination direction of an angle θ. The transmissive sections 120A are arranged at a first barrier pitch $p_{xB}$ in the x-axis direction and are arranged at a second barrier pitch $p_{yB}$ in the y-axis direction.

Here, in the display 110, the image oriented toward the N viewpoints is separated and the image oriented toward a single viewpoint is displayed in the sub-pixel 110S arranged in the inclination direction of the angle θ. That is, the image oriented toward the first viewpoint, the image oriented toward the second viewpoint, . . . , and the image oriented toward the N-th viewpoint are repeatedly arranged in sequence in the unit of the sub-pixel 110S arranged in the inclination direction of the angle θ. Accordingly, the first barrier pitch $p_{xB}$, the first sub-pixel pitch $p_{xS}$, and the first pixel pitch $p_{xP}$ satisfy a relationship expressed by Expression (3).

$$p_{xB} = N \cdot p_{xS} = N \cdot \frac{p_{xP}}{3} \tag{3}$$

Further, the second barrier pitch $p_{yB}$, the second sub-pixel pitch $p_{yS}$, and the second pixel pitch $p_{yP}$ satisfy a relationship expressed by Expression (4).

$$p_{yB} = N \cdot p_{yS} = N \cdot p_{yP} \tag{4}$$

The angle θ is determined by a ratio between the x-axis direction and the y-axis direction of the sub-pixel 110S. For example, when the first pixel pitch $p_{xP}$ and the second pixel pitch $p_{yP}$ are the same as each other, a relationship expressed by Expression (5) is satisfied.

$$\theta = \arctan 3 \tag{5}$$

1-2. Light Intensity Distribution in Image

Light Intensity Distribution of Display

Figure 3:
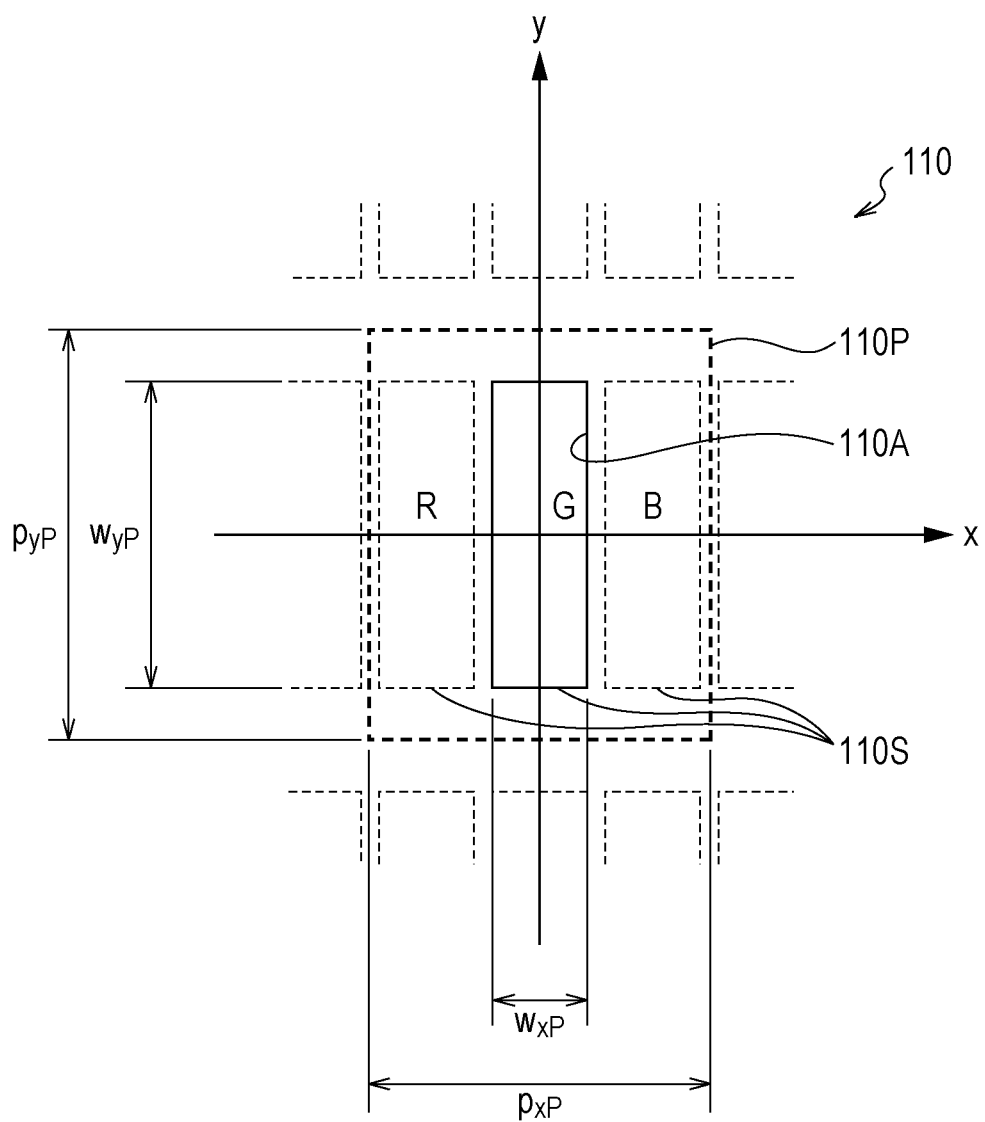
FIG. 3 is a diagram illustrating a pixel opening section according to the first embodiment of the disclosure.

FIG. 3 is a diagram illustrating a pixel opening section 110A according to the first embodiment of the disclosure. As shown in FIG. 3, the pixel opening section 110A is an opening section of one of the plurality of sub-pixels 110S that form the pixel 110P.

The pixel opening section 110A is a light-transmitting section of the pixel 110P for one of the three colors of R, G, and B. In the example shown in the drawing, G (green) light-transmitting section of the pixel 110P is set as the pixel opening section 110A. In this case, the pixel opening section 110A serves as an opening section of the sub-pixel 110S that displays G (green) light. The pixel opening section 110A has a first pixel opening width $w_{xP}$ in the x-axis direction and a second pixel opening width $w_{yP}$ in the y-axis direction.

Likewise, the same pixel opening section 110A exists in the pixel 110P (not shown) adjacent to the pixel 110P shown in the drawing. Accordingly, in the display 110, the interval of the pixel opening sections 110A in the x-axis direction is the same as the first pixel pitch $p_{xP}$ and the interval of the pixel opening sections 110A in the y-axis direction is the same as the second pixel pitch $p_{yP}$.

Figure 4:
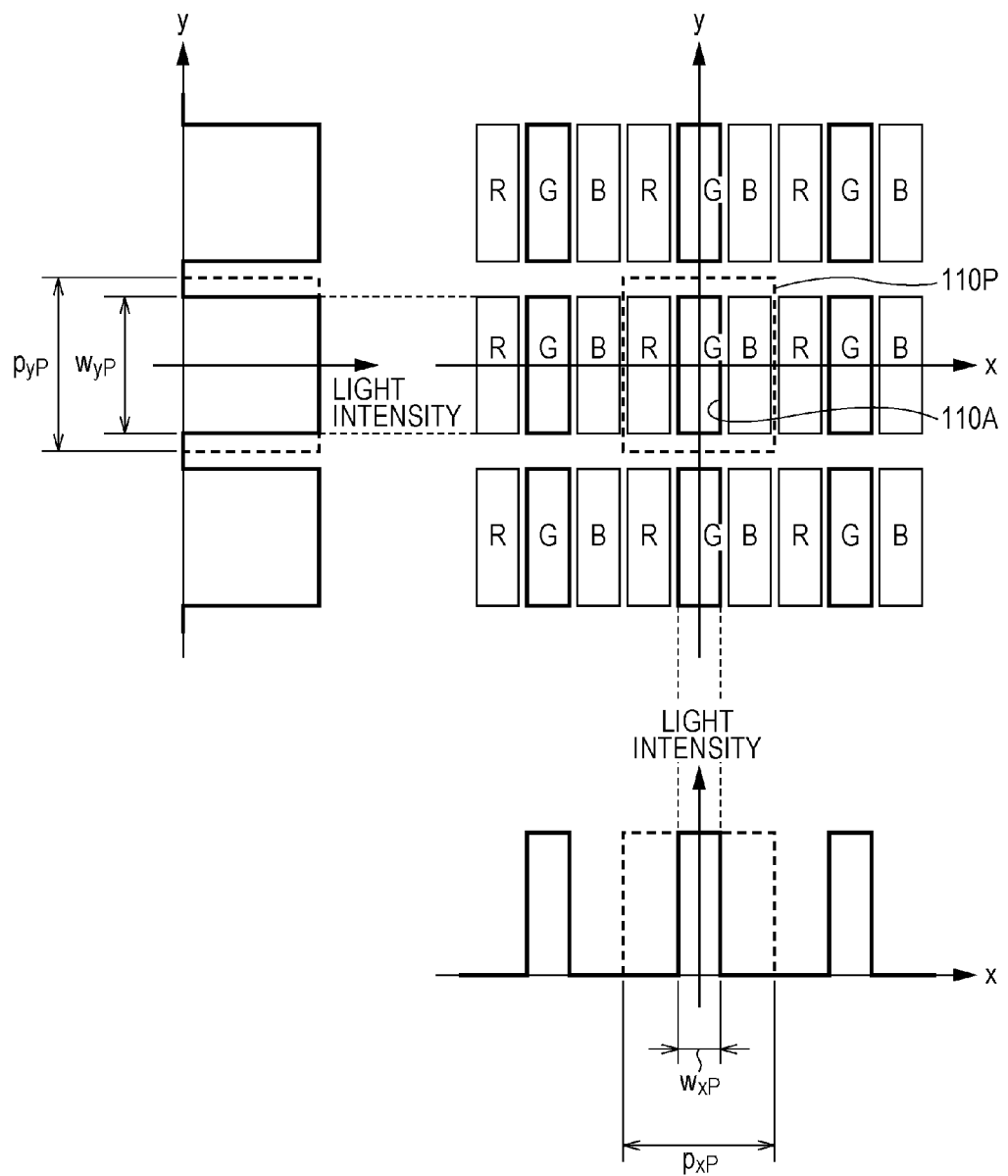
FIG. 4 is a diagram illustrating a light intensity distribution of the display according to the first embodiment of the disclosure.

FIG. 4 is a diagram illustrating a light intensity distribution of the display 110 according to the first embodiment of the disclosure. As shown in FIG. 4, the G (green) light intensity in the display 110 is distributed periodically in the x-axis and y-axis directions.

The display 110 emits the G (green) light in the pixel opening sections 110A which are the G (green) light-transmitting sections of the pixels 110P. As shown in the drawing, the pixels 110P are arranged at the first pixel pitch $p_{xP}$ in the x-axis direction and are arranged at the second pixel pitch $p_{yP}$ in the y-axis direction. In each pixel 110P, the pixel opening section 110A has a first pixel opening width $w_{xP}$ in the x-axis direction and has a second pixel opening width $w_{yP}$ in the y-axis direction.

Accordingly, the light intensity distribution of the display 110 has a pulse-shaped periodic structure with a period $p_{xP}$ and a width $w_{xP}$ in the x-axis direction. Further, the light intensity distribution has a pulse-shaped periodic structure with a period $p_{yP}$ and a width $w_{yP}$ in the y-axis direction. The light intensity observed with the two-dimensional periodic structure is expressed as a function $f_P(x,y)$ for the x and y coordinates using the Fourier series by Expression (6). In this expression, m and n denote the series order and $a_{mn}$, $a_m$, and $a_n$ denote Fourier coefficients.

$$f_P(x, y) = \sum_{m=-\infty}^{\infty} \sum_{n=-\infty}^{\infty} a_{mn} \cdot \exp\left[-i2\pi\left(\frac{m}{p_{xP}}x + \frac{n}{p_{yP}}y\right)\right] \quad (6)$$

$$= \sum_{m=-\infty}^{\infty} a_m \cdot \exp\left[-i2\pi\frac{m}{p_{xP}}x\right] \cdot \sum_{n=-\infty}^{\infty} a_n \cdot \exp\left[-i2\pi\frac{n}{p_{yP}}y\right]$$

Light Intensity Distribution by Parallax Barrier

Figure 5:
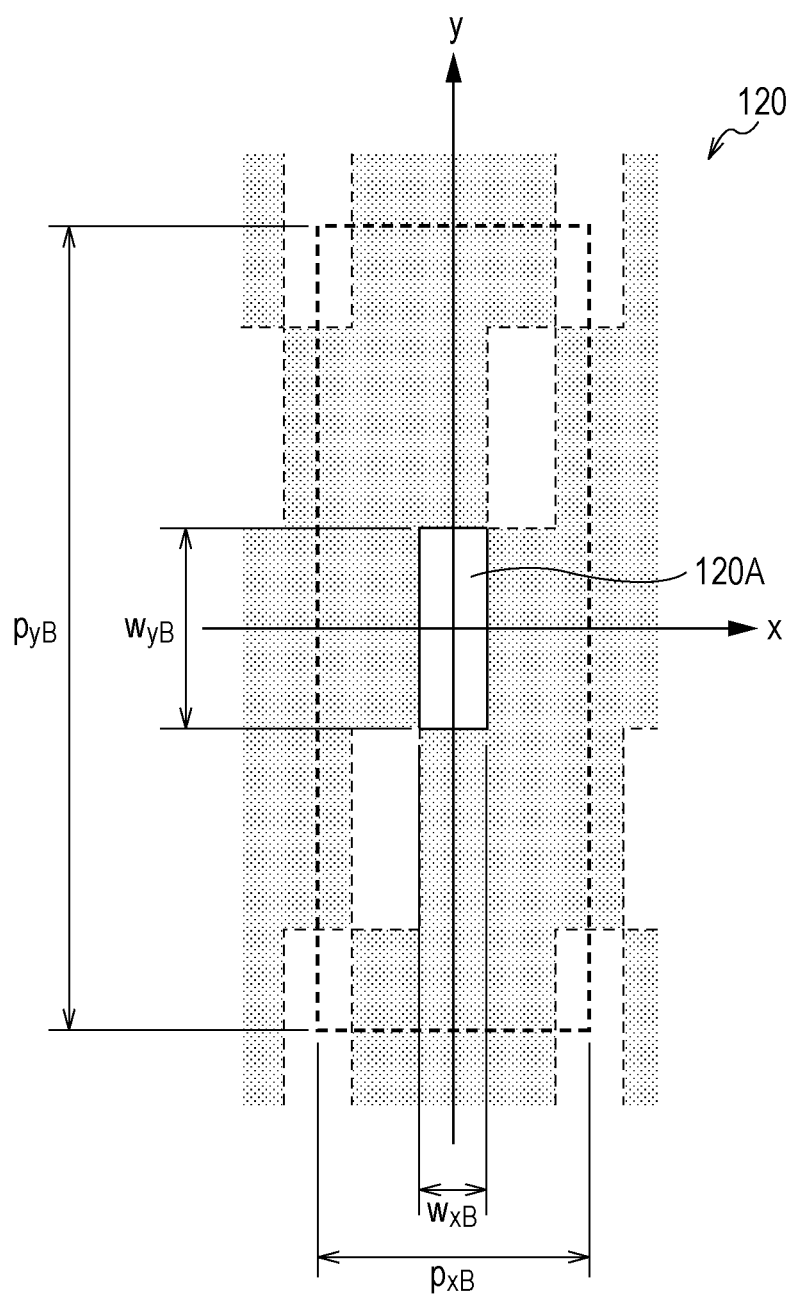
FIG. 5 is a diagram illustrating a transmission section according to the first embodiment of the disclosure.

FIG. 5 is a diagram illustrating the transmissive section 120A according to the first embodiment of the disclosure. As shown in FIG. 5, the transmissive sections 120A are periodically arranged in the parallax barrier 120.

The transmissive section 120A has a first width $w_{xB}$ in the x-axis direction and has a second width $w_{yB}$ in the y-axis direction. As shown in FIG. 2, the transmissive sections 120A are arranged at the first barrier pitch $p_{xB}$ in the x-direction and are arranged at the second barrier pitch $p_{yB}$ in the y-axis direction.

Figure 6:
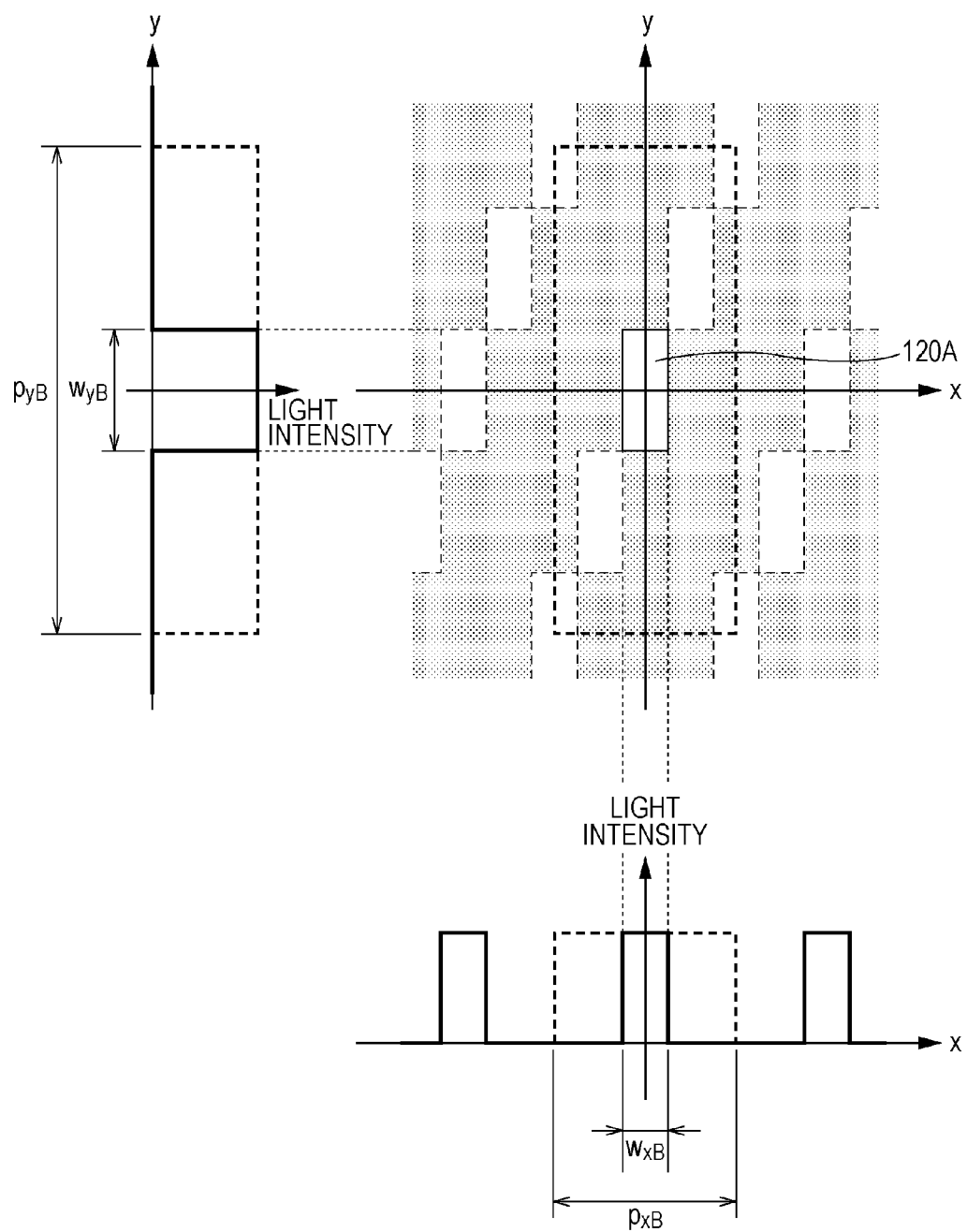
FIG. 6 is a diagram illustrating a light intensity distribution of a parallax barrier according to the first embodiment of the disclosure.

FIG. 6 is a diagram illustrating the light intensity distribution of a parallax barrier 120 according to the first embodiment of the disclosure. As shown in FIG. 6, the light intensity in the parallax barrier 120 is distributed periodically in the x-axis and y-axis directions.

In the parallax barrier 120, the transmissive sections 120A pass through the light from the display 110. As shown in the drawing, the transmissive sections 120A are arranged at the first barrier pitch $p_{xB}$ in the x-axis direction and are arranged at the second barrier pitch $p_{yB}$ in the y-axis direction. Further, the transmissive section 120A has a first width $w_{xB}$ in the x-axis direction and has a second width $w_{yB}$ in the y-axis direction.

Accordingly, the light intensity distribution of the parallax barrier 120 has a pulse-shaped periodic structure with a period $p_{xB}$ and a width $w_{xB}$ in the x-axis direction. Further, the light intensity distribution has a pulse-shaped periodic structure with a period $p_{yB}$ and a width $w_{yB}$ in the y-axis direction. The light intensity observed with the two-dimensional periodic structure is expressed as a function $f_B(x,y)$ for the x and y coordinates using the Fourier series by Expression (7). In this expression, m and n denote the series order and $b_{mn}$, $b_m$, and $b_n$ denote Fourier coefficients.

$$f_B(x, y) = \sum_{m=-\infty}^{\infty} \sum_{n=-\infty}^{\infty} b_{mn} \cdot \exp\left[-i2\pi\left(\frac{m}{p_{xB}}x + \frac{n}{p_{yB}}y\right)\right] \quad (7)$$

$$= \sum_{m=-\infty}^{\infty} b_m \cdot \exp\left[-i2\pi\frac{m}{p_{xB}}x\right] \cdot \sum_{n=-\infty}^{\infty} b_n \cdot \exp\left[-i2\pi\frac{n}{p_{yB}}y\right]$$

Light Intensity Distribution Observed in Image

The light intensity observed in an image displayed by the display apparatus 100 according to the first embodiment of the disclosure is a light intensity that is formed by superimposing the light intensity in the display 110 on the light intensity in the parallax barrier 120, as described above. The light intensity formed by the superimposing is expressed by a product of the functions representing the respective light intensities. Accordingly, the light intensity distribution observed in the image is expressed by a product of the function $f_P(x,y)$ of Expression (6) representing the light intensity in the display 110 and the function $f_B(x,y)$ of Expression (7) representing the light intensity in the parallax barrier 120, as in Expression (8).

$$f_P(x, y) \cdot f_B(x, y) = \sum_{m=-\infty}^{\infty} \sum_{n=-\infty}^{\infty} a_{mn} \cdot \exp\left[-i2\pi\left(\frac{m}{p_{xP}}x + \frac{n}{p_{yP}}y\right)\right] \cdot \quad (8)$$

$$\sum_{m=-\infty}^{\infty} \sum_{n=-\infty}^{\infty} b_{mn} \cdot \exp\left[-i2\pi\left(\frac{m}{p_{xB}}x + \frac{n}{p_{yB}}y\right)\right]$$

$$= \sum_{m=-\infty}^{\infty} a_m \cdot \exp\left[-i2\pi\frac{m}{p_{xP}}x\right] \cdot \sum_{n=-\infty}^{\infty} a_n \cdot$$

$$\exp\left[-i2\pi\frac{n}{p_{yP}}y\right] \cdot \sum_{m=-\infty}^{\infty} b_m \cdot$$

$$\exp\left[-i2\pi\frac{m}{p_{xB}}x\right] \cdot \sum_{n=-\infty}^{\infty} b_n \cdot$$

$$\exp\left[-i2\pi\frac{n}{p_{yB}}y\right]$$

Figure 7:
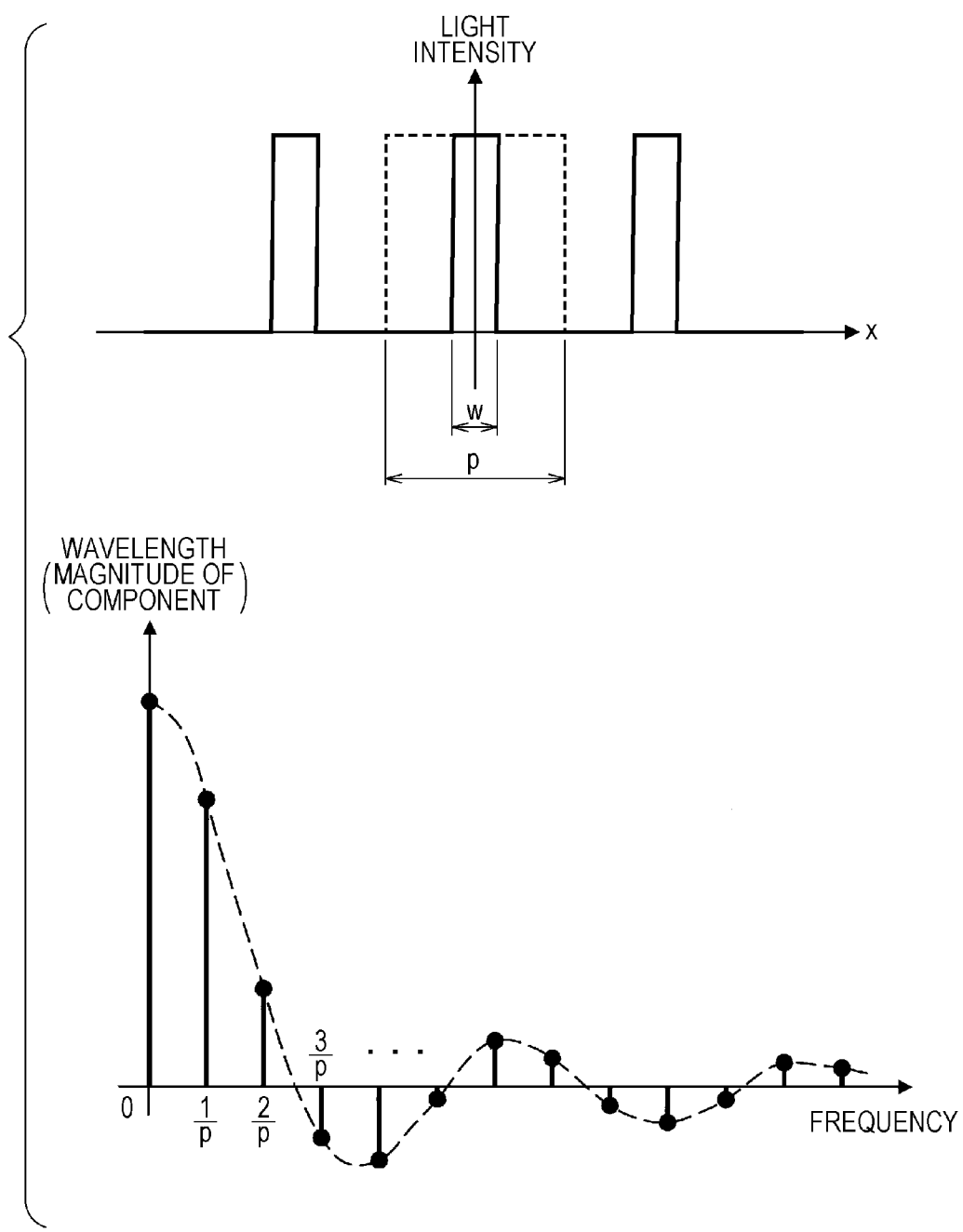
FIG. 7 is a diagram illustrating a frequency spectrum of the light intensity distribution according to the first embodiment of the disclosure.

FIG. 7 is a diagram illustrating a frequency spectrum of the light intensity distribution according to the first embodiment of the disclosure. As shown in FIG. 7, the light intensity having a pulse-shaped periodic structure with a period p and a width w has a discrete spectrum with an interval of 1/p.

The envelope line of the discrete spectrum of a function having a pulse-shaped periodic structure becomes a sinc function. When the envelope line of the discrete spectrum is applied to the function $f_P(x,y)$ of Expression (6) representing the light intensity of the display 110, a Fourier coefficient of the product form of the sinc function is calculated as in Expression (9).

$$a_{mn} = a_m \cdot a_n = \frac{\sin\left(\frac{w_{xP}}{p_{xP}}m\pi\right)}{m\pi} \frac{\sin\left(\frac{w_{yP}}{p_{yP}}n\pi\right)}{n\pi} \quad (9)$$

Likewise, when the envelope line is applied to the function $f_B(x,y)$ of Expression (7) representing the light intensity in the parallax barrier 120, a Fourier coefficient in which a coefficient is applied to the sinc function is calculated, as in Expression (10), when j is any integer.

$$b_{mn} = \frac{\sin\left(\frac{w_{xB}}{p_{xB}}m\pi\right)}{m\pi} \frac{\sin\left(\frac{w_{yB}}{p_{yB}}n\pi\right)}{n\pi} \cdot \sum_{j=1}^{\frac{N}{2}} 2\cos\left[\frac{2j-1}{N}(m+n)\pi\right] \text{(EVEN NUMBER)} \quad (10)$$

$$b_{mn} = \frac{\sin\left(\frac{w_{xB}}{p_{xB}}m\pi\right)}{m\pi} \frac{\sin\left(\frac{w_{yB}}{p_{yB}}n\pi\right)}{n\pi} \cdot \left\{1 + \sum_{j=1}^{\frac{N-1}{2}} 2\cos\left[\frac{2j}{N}(m+n)\pi\right]\right\} \text{(ODD NUMBER)}$$

Expression (10) is established, when $w_{xB} \leq p_{yB}/N$ and $w_{yB} \leq p_{yB}/N$. In other cases, the product portion of the sinc function is the same even when the coefficient portion is varied.

1-3. Cause to Generation of Moire

Figure 8:
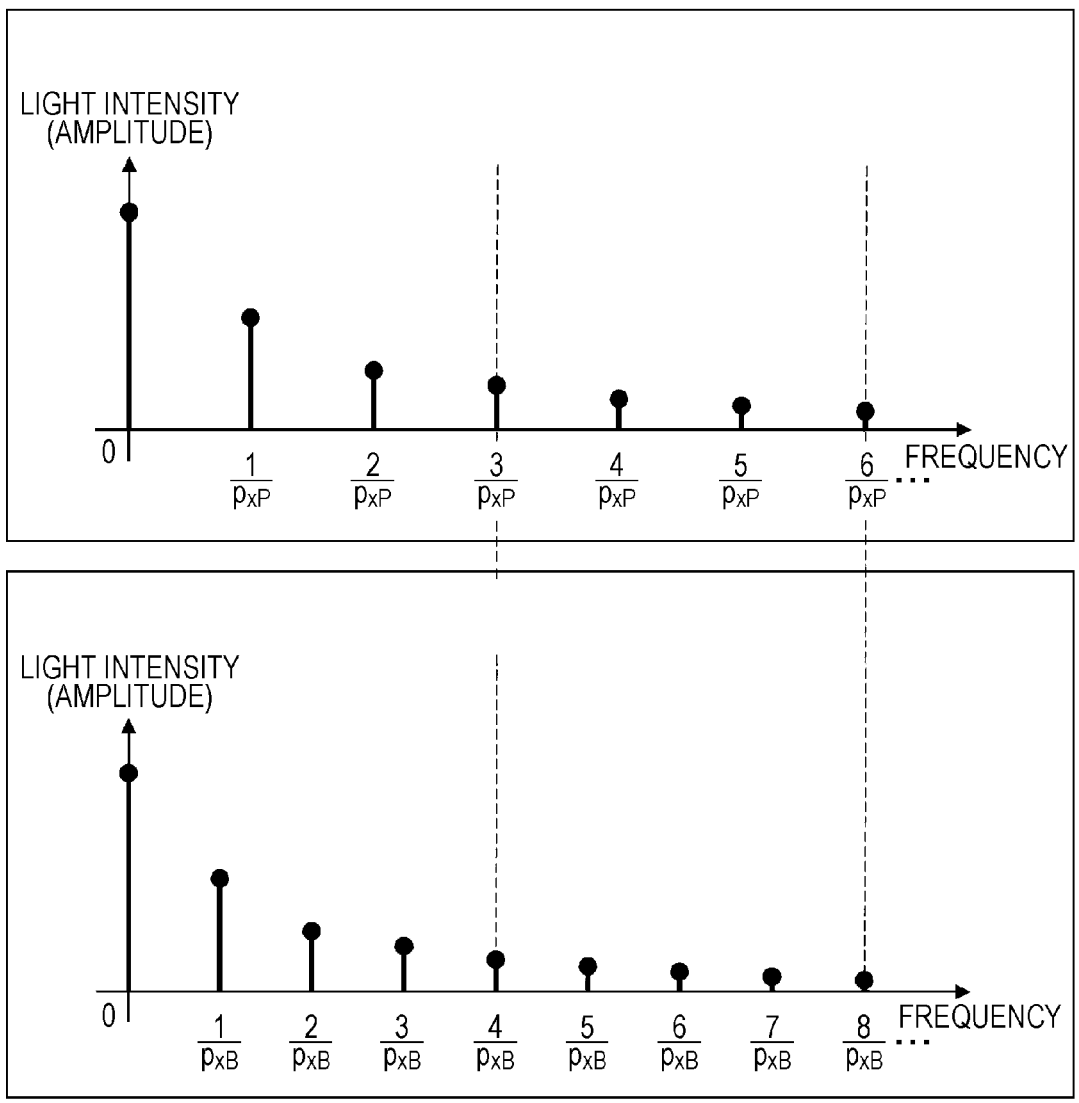
FIG. 8 is a diagram illustrating superposition between the frequency spectra of the light intensity distributions according to the first embodiment of the disclosure.

FIG. 8 is a diagram illustrating the superposition between the frequency spectra of the light intensity distributions according to the first embodiment of the disclosure. The frequency spectrum of the light intensity distribution of the display 110 is shown in the x axis direction in the upper part of FIG. 8. The frequency spectrum of the light intensity distribution of the parallax barrier 120 is shown in the x axis direction in the lower part of FIG. 8.

As described above, the light intensity distribution having the pulse-shaped periodic structure has a discrete spectrum with the reciprocal of a periodic interval. The light intensity distribution of the display 110 shown in the upper side of the drawing has a discrete spectrum of an interval of $1/p_{xP}$. Likewise, the light intensity distribution of the parallax barrier 120 shown in the lower side of the drawing has a discrete spectrum of an interval of $1/p_{xB}$.

Here, a cause of generation of a moire will be described. The moire is generated as luminance unevenness caused by beat (buzz) between frequency components when frequency components slightly different from each other in frequency are contained in the frequency component of each of the superimposed light intensity distributions when the plurality of light intensity distributions are superimposed on each other. The magnitude of the luminance unevenness depends on a product of the amplitudes (magnitude of light intensity) of the respective frequency components in which the beat occurs.

Accordingly, when the amplitude (light intensity) of the frequency component in which the beat occurs is large, the large luminance unevenness is generated, thereby observing the strong moire. Since the actual values of the first pixel pitch $p_{xP}$ and the first barrier pitch $p_{xB}$ depend on the mechanical processing accuracy and may have a small error, there is a high possibility of the moire being generated in the frequency component commonly contained in the respective light intensity distributions calculated by a value in terms of a design.

A condition for the frequency component commonly contained in the respective light intensity distributions of the display 110 and the parallax barrier 120 in the x-axis direction is expressed by Expression (11), when Expression (3) is used.

$$\frac{N}{p_{xB}} = \frac{3}{p_{xP}} \quad (11)$$

In this embodiment, since the number of viewpoints N is 4, a relationship of "$4/p_{xB} = 3/p_{xP}$" is satisfied. Accordingly, in the example shown in FIG. 8, the components satisfying the above condition include the component with the frequency of $3/p_{xP}$ in the frequency component of the display 110, the component with the frequency of $4/p_{xB}$ in the frequency component of the parallax barrier 120, the component with the frequency of $6/p_{xP}$ in the frequency component of the display 110, and the component with the frequency of $8/p_{xB}$ in the frequency component of the parallax barrier 120.

The case in which the x-axis direction is used has hitherto been described, but the same relationship is applied to the y-axis direction, which is the second direction. A condition for the frequency component commonly contained in the respective light intensity distributions of the display 110 and the parallax barrier 120 in the y-axis direction is expressed by Expression (12), when Expression (4) is used.

$$\frac{N}{p_{yB}} = \frac{1}{p_{yP}} \quad (12)$$

A condition that the moire is generated in the observed image is expressed by Expression (13) from Expression (11) and Expression (12), when s and t are any integers.

$$\left(s\frac{N}{p_{xB}}, t\frac{N}{p_{yB}}\right) = \left(s\frac{3}{p_{xP}}, t\frac{1}{p_{yP}}\right) \quad (13)$$

In this embodiment, N is 4 in Expression (12) and Expression (13), as described above.

Figure 9:
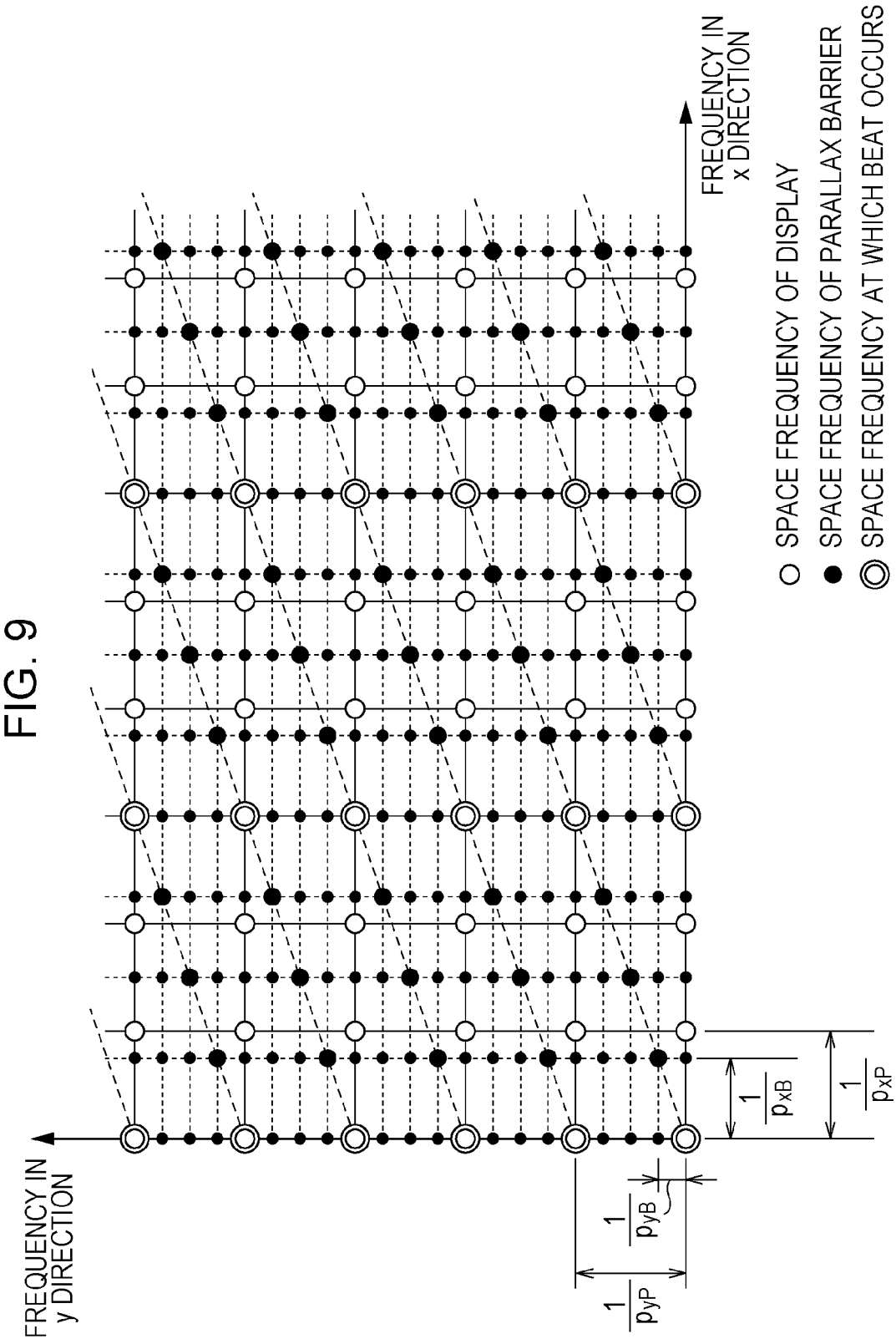
FIG. 9 is a diagram illustrating a combination of the frequencies of the light intensities in first and second directions according to the first embodiment of the disclosure.

FIG. 9 is a diagram illustrating a combination of the frequencies of the light intensities in the x-axis direction, which is the first direction, and y-axis direction, which is the second direction, according to the first embodiment of the disclosure. As shown in FIG. 9, the combination of the space frequencies of the light intensity distribution of the display 110 and the light intensity distribution of the parallax barrier 120 in the x-axis and y-axis directions is plotted.

The frequency distribution shown here is a frequency distribution formed by combining the frequency distributions described with reference to FIG. 8 in the x-axis and y-axis directions. Accordingly, the combination of the frequency components commonly contained in the light intensity distribution of the display 110 and the light intensity distribution of the parallax barrier 120 in the x-axis and y-axis directions is shown as a combination of the frequency components in which the beat occurs. Here, the frequency at which the beat (moire) occurs appears at an equal interval in the xy space due to the periodicity of the light intensity distribution of the display 110 and the periodicity of the light intensity distribution of the parallax barrier 120.

1-4. Design for Reducing Moire

As expressed in Expression (8), the light intensity observed in the image is expressed by the product of the light intensity of the display 110 and the light intensity of the parallax barrier 120. Accordingly, when one of the light intensities approaches 0 in the combination of the frequency components at which the moire is generated, it is possible to reduce the moire.

First, when the Fourier coefficient expressed by Expression (9) becomes 0 in the light intensity distribution of the display 110, the light intensity (amplitude) of the frequency at which the moire is generated can be made to approach 0, thereby preventing the moire from being generated. The condition that the Fourier coefficient becomes 0 is expressed by Expression (14), when j is any integer.

$$\frac{\sin\left(\frac{w_{xP}}{p_{xP}}3j\pi\right)}{3j\pi} = 0 \text{ OR } \frac{\sin\left(\frac{w_{yP}}{p_{yP}}j\pi\right)}{j\pi} = 0 \tag{14}$$

The above condition is expressed by Expression (15) from Expression (1) and Expression (2). In this condition, since the first pixel opening width $w_{xP}$ is not greater than the first sub-pixel pitch $p_{xS}$ and the second pixel opening width $w_{yP}$ is not greater than the second sub-pixel pitch $p_{yS}$, the condition of Expression (14) is restricted to a case where j=1.

$$w_{xP} = p_{xS} \text{ OR } w_{yP} = q_{yS} \tag{15}$$

Furthermore, the condition that the Fourier coefficient expressed by Expression (10) becomes 0 in the light intensity distribution of the parallax barrier 120 is expressed by Expression (16), when j is any integer.

$$\frac{\sin\left(\frac{w_{xB}}{p_{xB}}jN\pi\right)}{jN\pi} = 0 \text{ OR } \frac{\sin\left(\frac{w_{yB}}{p_{yB}}jN\pi\right)}{jN\pi} = 0 \tag{16}$$

The above condition is expressed by Expression (17) from Expression (3) and Expression (4). In this condition, since the first width $w_{xB}$ is not greater than the first barrier pitch $p_{xB}$ and the second width $w_{yB}$ is not greater than the second barrier pitch $p_{yB}$, j is 1, 2, ..., N. That is, j is a natural number equal to or less than the number of viewpoints N.

$$\frac{w_{xB}}{p_{xB}} = j \text{ OR } \frac{w_{yB}}{p_{yB}} = j \tag{17}$$

When the conditions expressed by Expression (15) for the display 110 and Expression (17) for the parallax barrier 120 are summarized, one of the following conditions may be satisfied in order to reduce the moire observed in the image displayed by the display apparatus 100.

(a) A ratio of the first width $w_{xB}$ to the first sub-pixel pitch $p_{xS}$ is a natural number equal to or less than N.

(b) A ratio of the second width $w_{yB}$ to the second sub-pixel pitch $p_{yS}$ is a natural number equal to or less than N.

(c) The first pixel opening width $w_{xP}$ is identical to the first sub-pixel pitch $p_{xS}$.

(d) The second pixel opening width $w_{yP}$ is identical to the second sub-pixel pitch $p_{yS}$.

In the actual design of the display apparatus 100, it is difficult to precisely satisfy the above-mentioned conditions since there is a necessity to form a space for a driving circuit between the sub-pixels 110S. However, by designing the display apparatus so as to approximate the above-mentioned conditions, the moire can be reduced to some extent. In this case, by designing the display apparatus so as to satisfy a number of the conditions (a) to (d), the product of four Fourier coefficients shown in Expression (8) has a smaller value, thereby further reducing the moire.

In the actual display apparatus 100, however, an experiment described below proves that the moire may not necessarily be reduced even when the above-mentioned conditions are satisfied. Hereinafter, a method of reducing the moire in the display apparatus 100 will be described based on this fact.

Distance Between Display and Parallax Barrier

Figure 10:
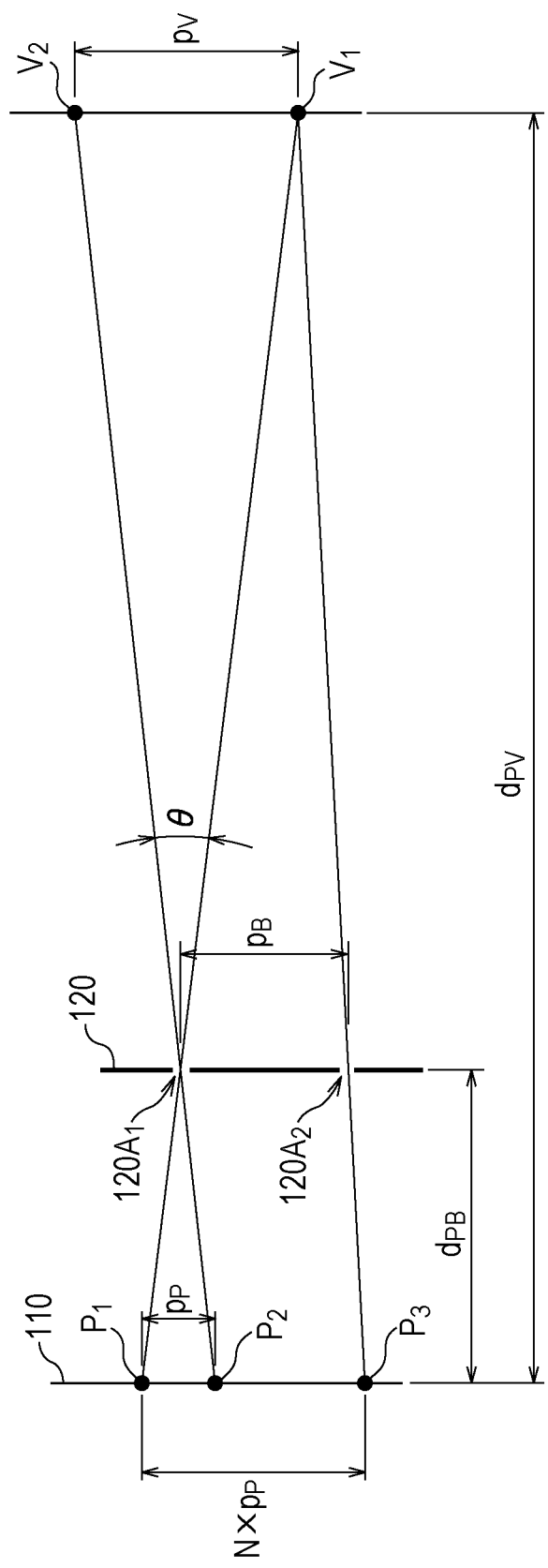
FIG. 10 is a diagram illustrating a distance between the display and the parallax barrier according to the first embodiment of the disclosure.
Figure 11A:
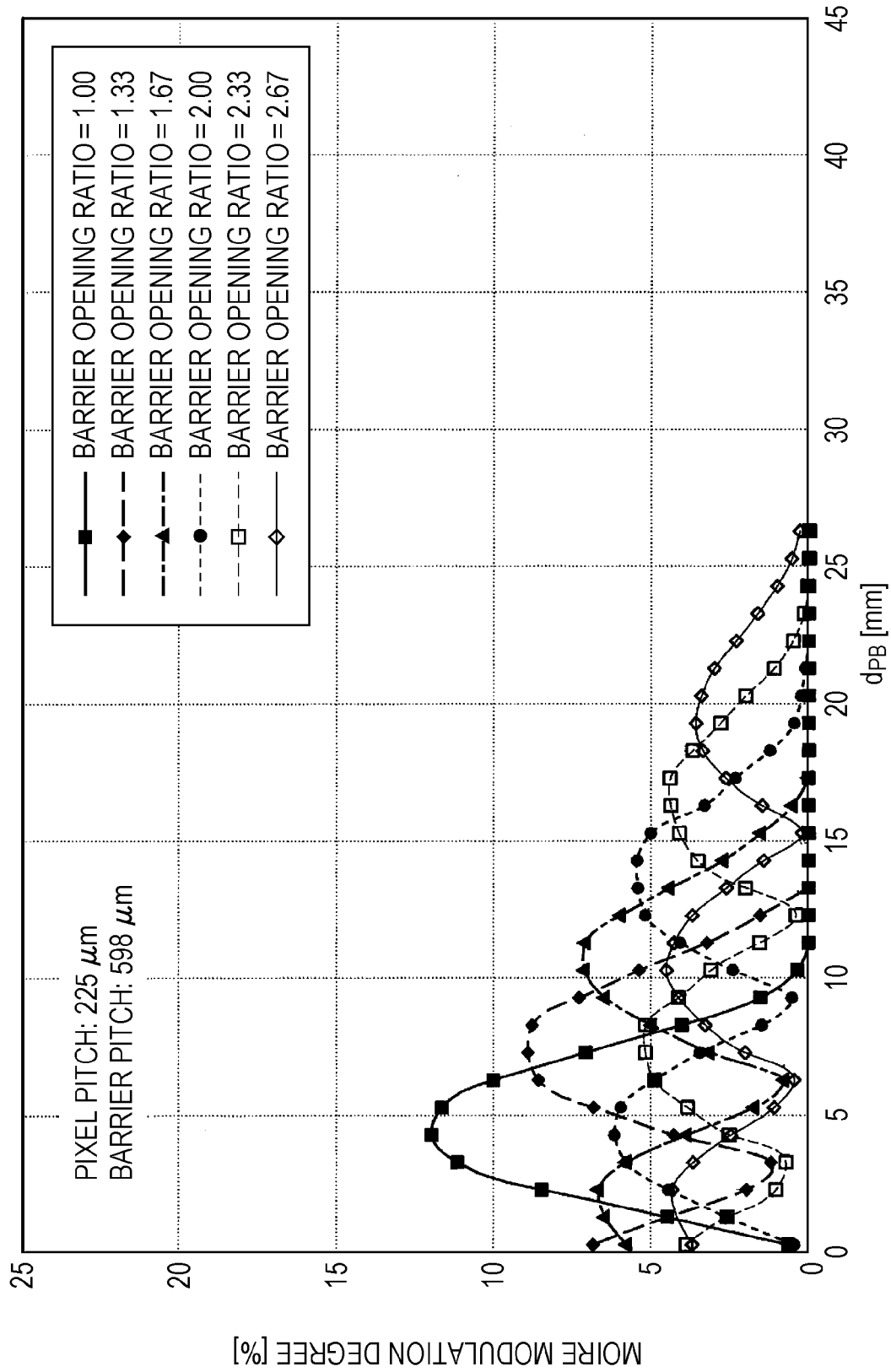
FIG. 11A is a graph illustrating a relationship between the distance from the display to the parallax barrier and a moire modulation degree according to the first embodiment of the disclosure.
Figure 11C:
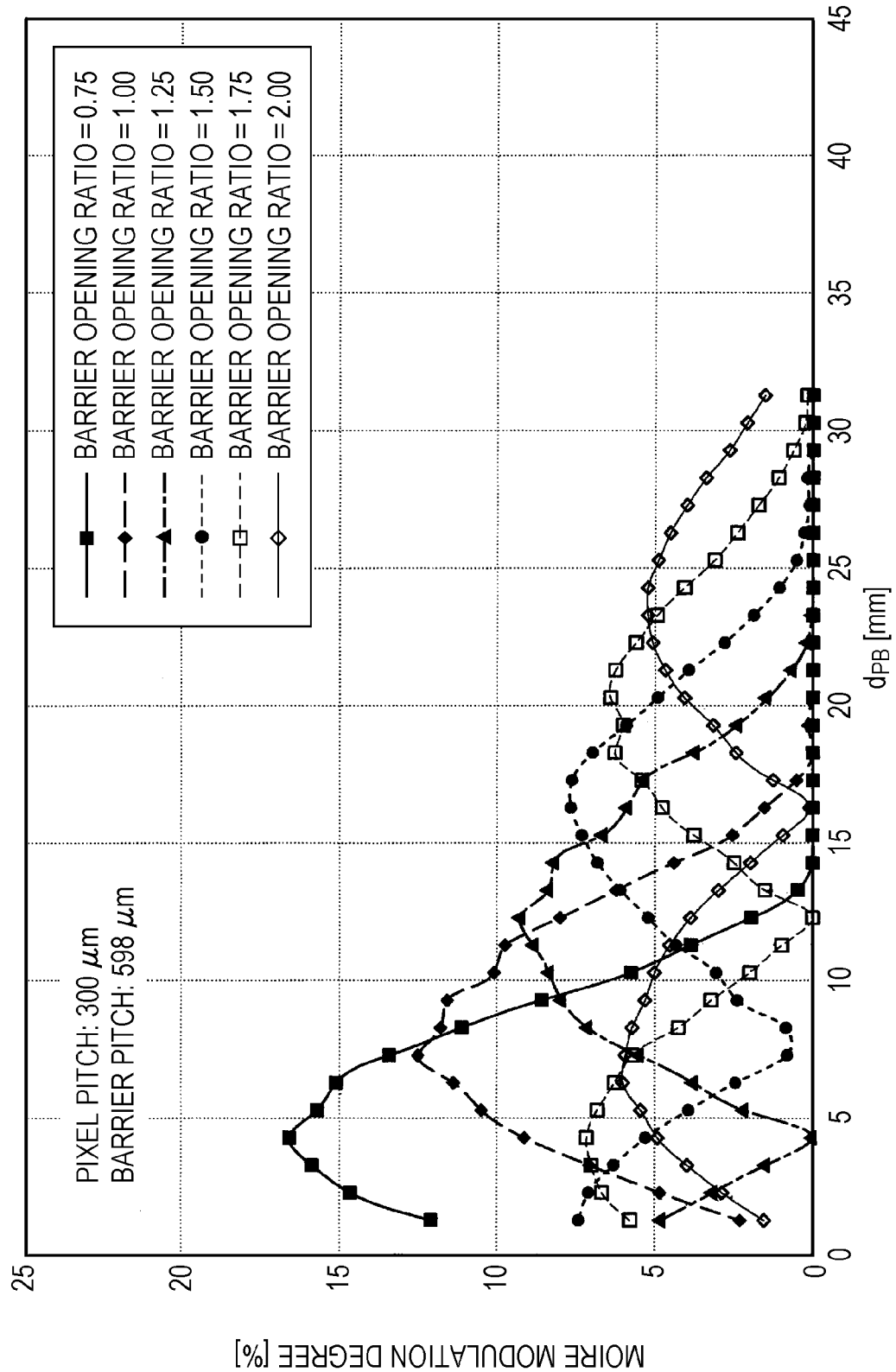
FIG. 11C is a graph illustrating a relationship between the distance from the display to the parallax barrier and the moire modulation degree according to the first embodiment of the disclosure.
Figure 11D:
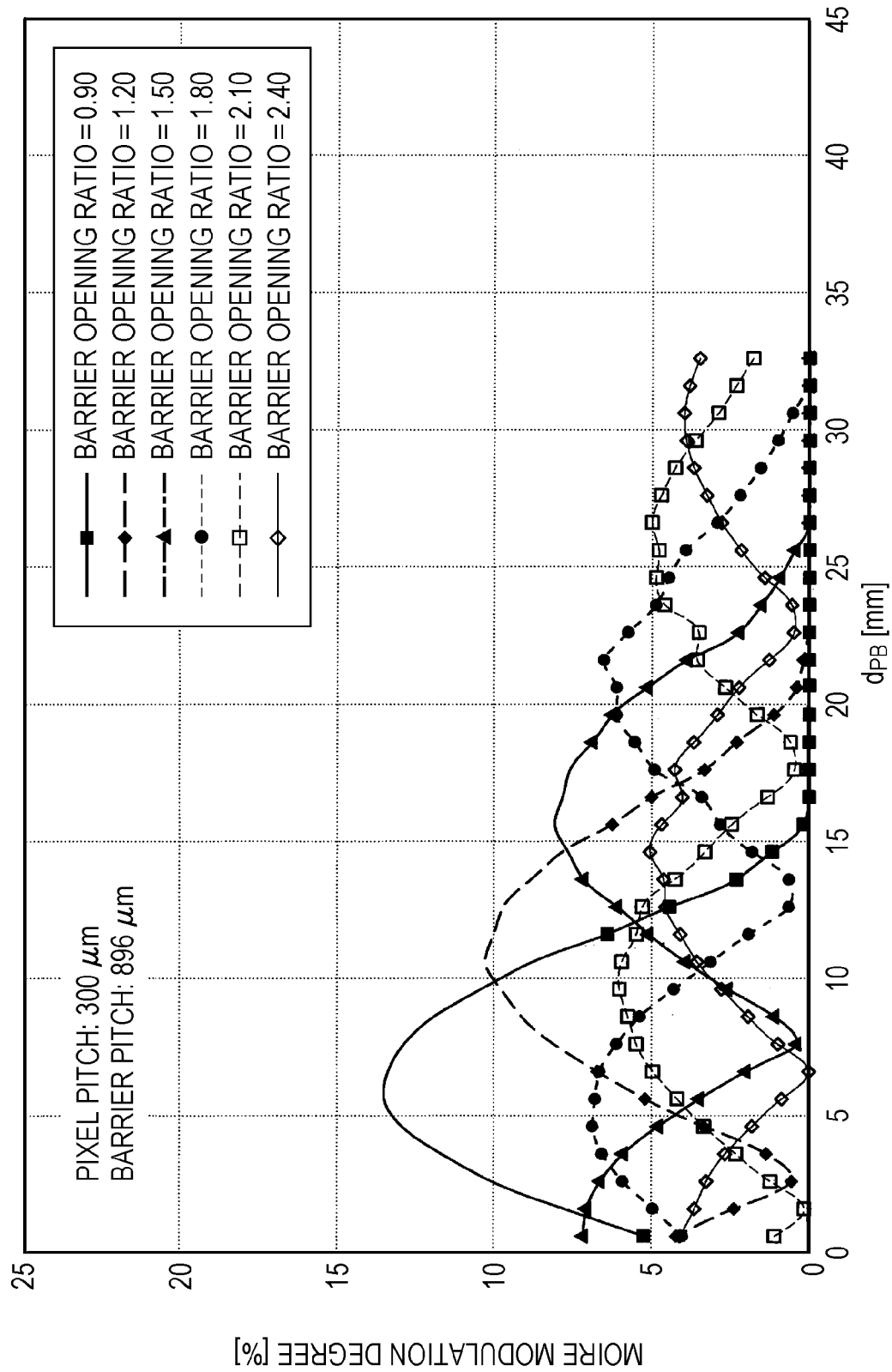
FIG. 11D is a graph illustrating a relationship between the distance from the display to the parallax barrier and the moire modulation degree according to the first embodiment of the disclosure.
Figure 11E:
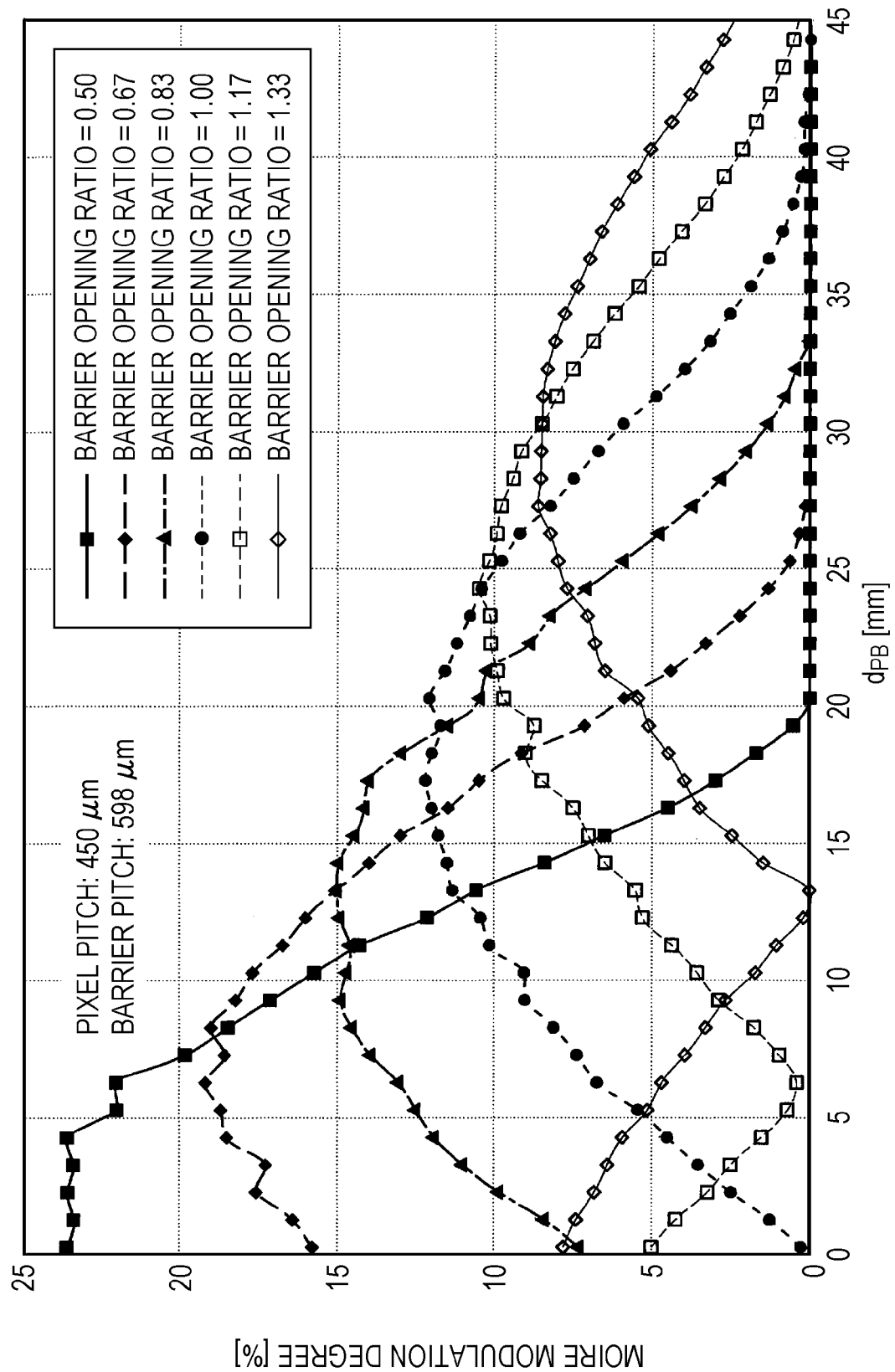
FIG. 11E is a graph illustrating a relationship between the distance from the display to the parallax barrier and the moire modulation degree according to the first embodiment of the disclosure.
Figure 11F:
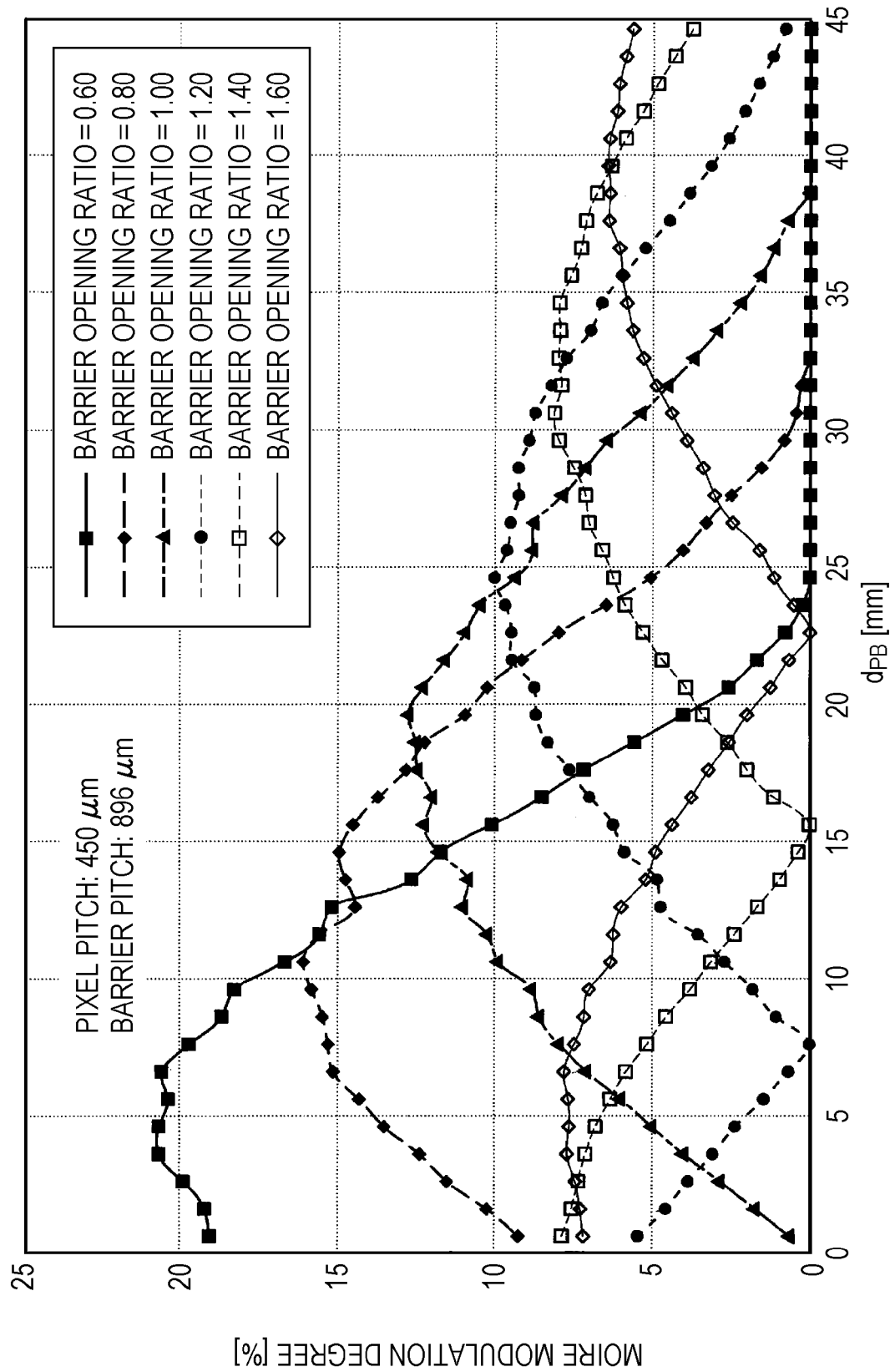
FIG. 11F is a graph illustrating a relationship between the distance from the display to the parallax barrier and the moire modulation degree according to the first embodiment of the disclosure.

FIG. 10 is a diagram illustrating a distance $d_{PB}$ between the display 110 and the parallax barrier 120 according to the first embodiment of the disclosure. Here, the description has hitherto been described using the first pixel pitch $p_{xP}$ and the barrier pitch $p_{xB}$ in the x-axis direction. However, the same relationship is also established in the y-axis direction.

As shown in FIG. 10, a distance $d_{PB}$ between the display 110 and the parallax barrier 120 and a distance $d_{PV}$ between the display 110 and viewpoints $V_1$ and $V_2$ are shown. Here, the viewpoints $V_1$ and $V_2$ are two viewpoints adjacent to each other. The interval between the viewpoints $V_1$ and $V_2$ is a viewpoint interval $p_{xV}$. In the display 110, pixels $P_1$ and $P_2$ adjacent to each other are shown. The interval between the pixels $P_1$ and $P_2$ is a first pixel pitch $p_{xP}$. In the parallax barrier 120, transmissive sections $120A_1$ and $120A_2$ adjacent to each other are shown. The interval between the transmissive sections $120A_1$ and $120A_2$ is a barrier pitch $p_{xB}$. Here, the pixel $P_1$ supplies an image to the viewpoint $V_1$ through the transmissive section $120A_1$. The pixel $P_2$ supplies an image to the viewpoint $V_2$ through the transmissive section $120A_1$. The straight line between the pixel $P_1$ and the viewpoint $V_1$ and the straight line between the pixel $P_2$ and the viewpoint $V_2$ form two isosceles triangles with an apex angle θ. Accordingly, a relationship expressed by Expression (18) is established between the distances $d_{PB}$ and $d_{PV}$ using the homothetic ratio.

$$d_{PB} = \frac{p_{xP}}{p_{xP} - p_{xV}} \cdot d_{PV} \tag{18}$$

In the display 110, a pixel $P_3$ supplying an image to the viewpoint $V_1$ through the transmissive section $120A_2$ is shown. The interval between the pixels $P_1$ and $P_3$ is $N \times p_{xP}$ when the number of viewpoints is N. A relationship expressed by Expression (19) is established among the barrier pitch $p_{xB}$, the first pixel pitch $p_{xP}$, and the viewpoint interval $p_{xV}$, when the number of viewpoints is N.

$$p_{xB} = \frac{N \cdot p_{xP} \cdot p_{xV}}{p_{xV} - p_{xP}} \tag{19}$$

FIGS. 11A to 11F are graphs illustrating a relationship between the distance $d_{PB}$ from the display 110 to the parallax barrier 120 and a moire modulation degree $f_m$ according to the first embodiment of the disclosure. As shown in FIGS. 11A to 11F, it can be understood that the moire modulation degree $f_m$ is periodically varied for the distance $d_{PB}$.

Here, the moire modulation degree $f_m$ is a value calculated by Expression (20). In this expression, $I_{max}$ denotes the maximum luminance on the display surface 115 and $I_{min}$ denotes the minimum luminance on the display surface 115. Further, the barrier opening ratio is a ratio of the width $v_{xB}$ to the first sub-pixel pitch $p_{xS}$ and is expressed as $v_{xB}/P_{xS}$.

$$f_m = \frac{I_{max} - I_{min}}{I_{max} + I_{min}} \times 100 \tag{20}$$

In FIGS. 11A to 11F, a variation in the moire modulation degree $f_m$ is shown for each barrier opening ratio $v_{xB}/P_{xS}$ when the distance $d_{PB}$ is varied in a state where the first pixel pitch $p_{xP}$ and the barrier pitch $p_{xB}$ are fixed. For example, in the graph shown in FIG. 11A, the moire modulation degree $f_m$ becomes the minimum when the barrier opening ratio $v_{xB}/P_{xS}$ is 2.33 and the distance $d_{PB}$ is 3.3 or 12.3. Further, the moire modulation degree $f_m$ becomes the minimum when the barrier opening ratio $v_{xB}/P_{xS}$ is 2.67 and the distance $d_{PB}$ is 6.3 or 15.3. In the graph shown in FIG. 11b, the moire modulation degree $f_m$ becomes the minimum when the barrier opening ratio $v_{xB}/P_{xS}$ is 3.20 and the distance $d_{PB}$ is 1.6, 10.6, or 20.6.

Thus, in the plurality of combinations of the first pixel pitch $p_{xP}$, the barrier pitch $p_{xB}$, and the barrier opening ratio $v_{xB}/P_{xS}$, the moire modulation degree $f_m$ becomes the minimum in the plurality of distances $d_{PB}$, when the distance $d_{PB}$ is varied. Further, the value of the distance $d_{PB}$ in which the moire modulation degree $f_m$ becomes the minimum can be periodically present. Therefore, by carrying out the experiments shown in FIGS. 11A and 11F, FIGS. 12A to 12C shows graphs plotting the combinations of the barrier opening ratio $v_{xB}/P_{xS}$ and distance $d_{PB}$ in which the moire modulation degree $f_m$ becomes the minimum for each first pixel pitch $p_{xP}$.

Figure 12A:
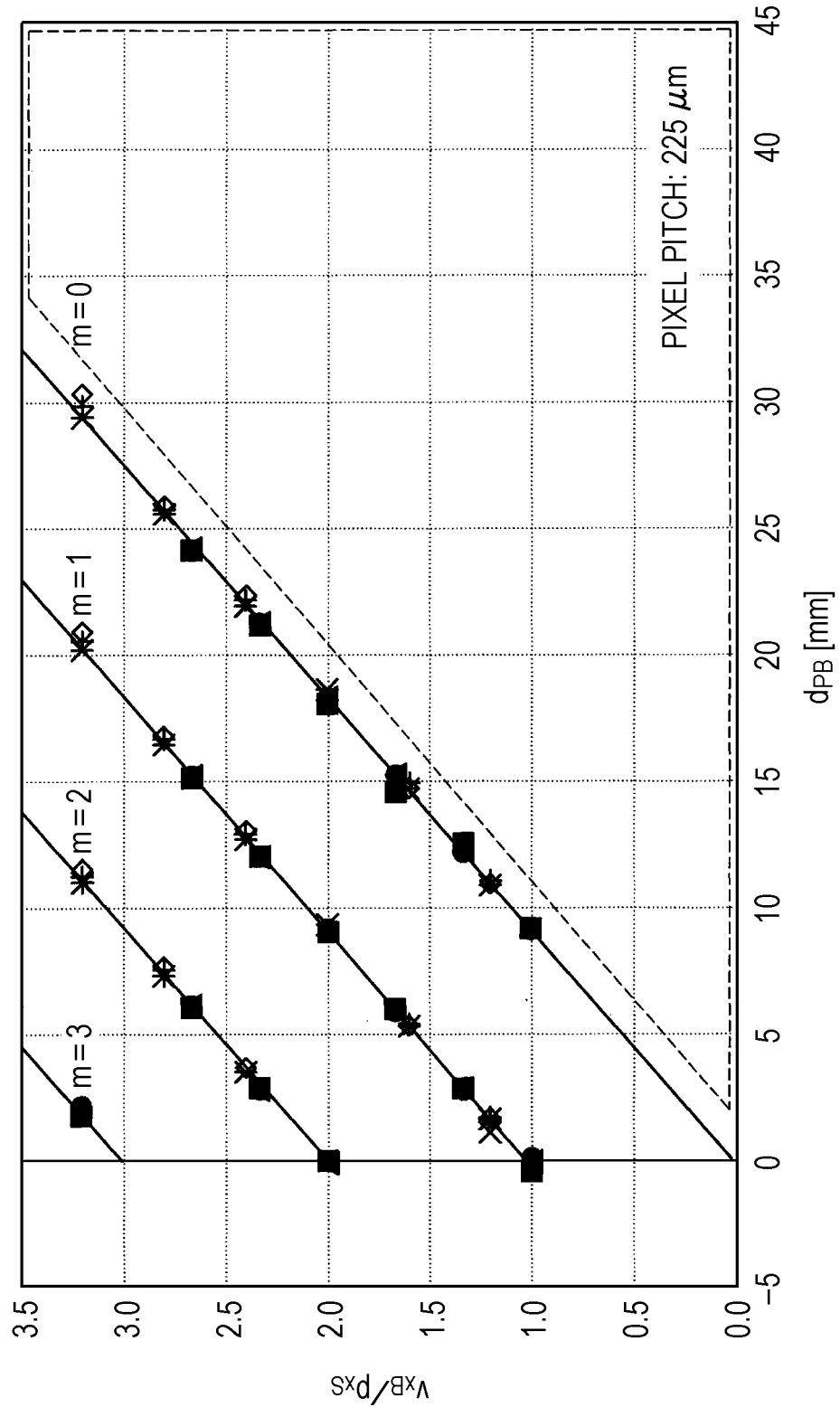
FIG. 12A is a graph illustrating the combinations of the barrier opening ratio and distance between the display and the parallax barrier in which the moire modulation degree becomes the minimum for each pixel pitch according to the first embodiment of the disclosure.
Figure 12B:
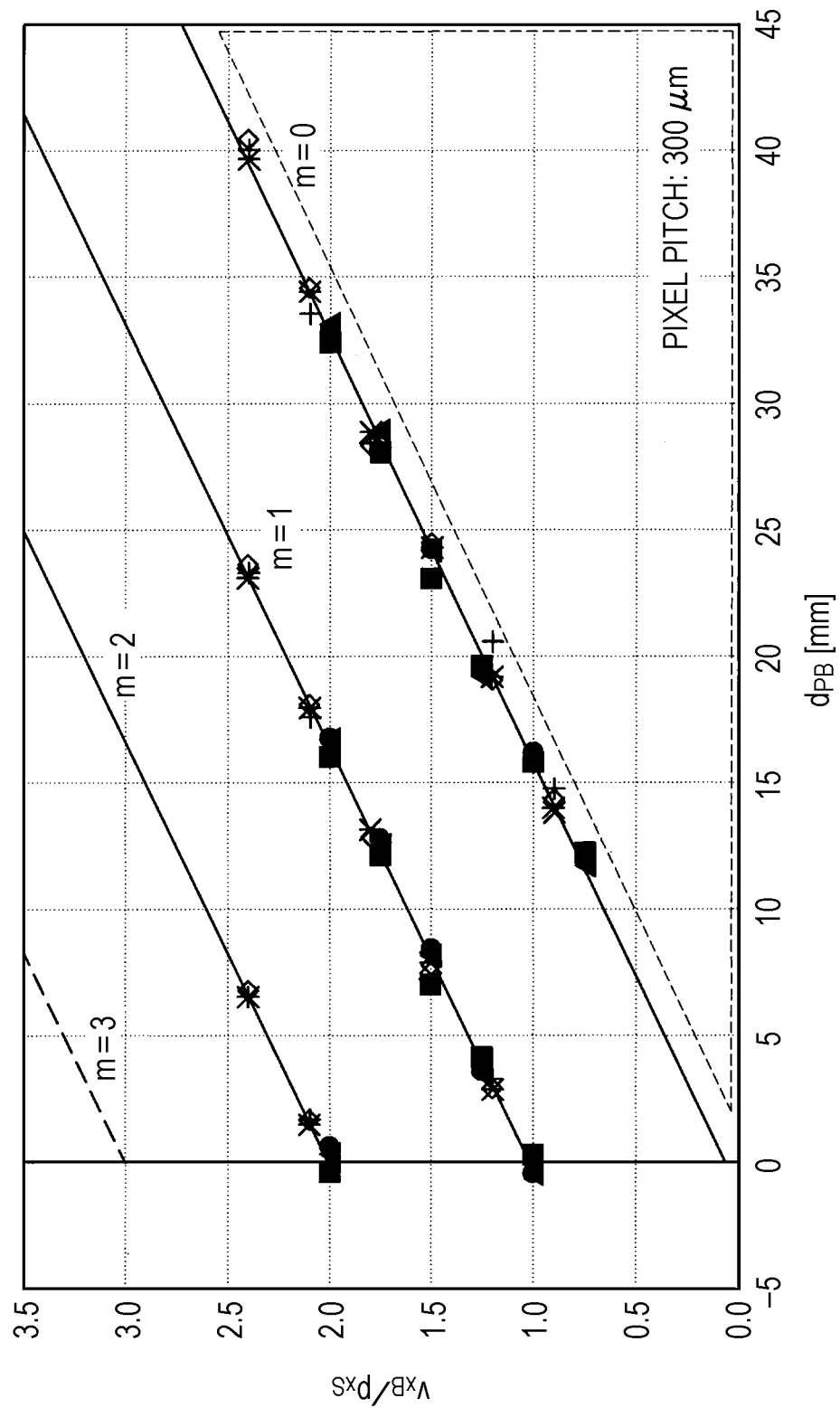
FIG. 12B is a graph illustrating the combinations of the barrier opening ratio and distance between the display and the parallax barrier in which the moire modulation degree becomes the minimum for each pixel pitch according to the first embodiment of the disclosure.
Figure 12C:
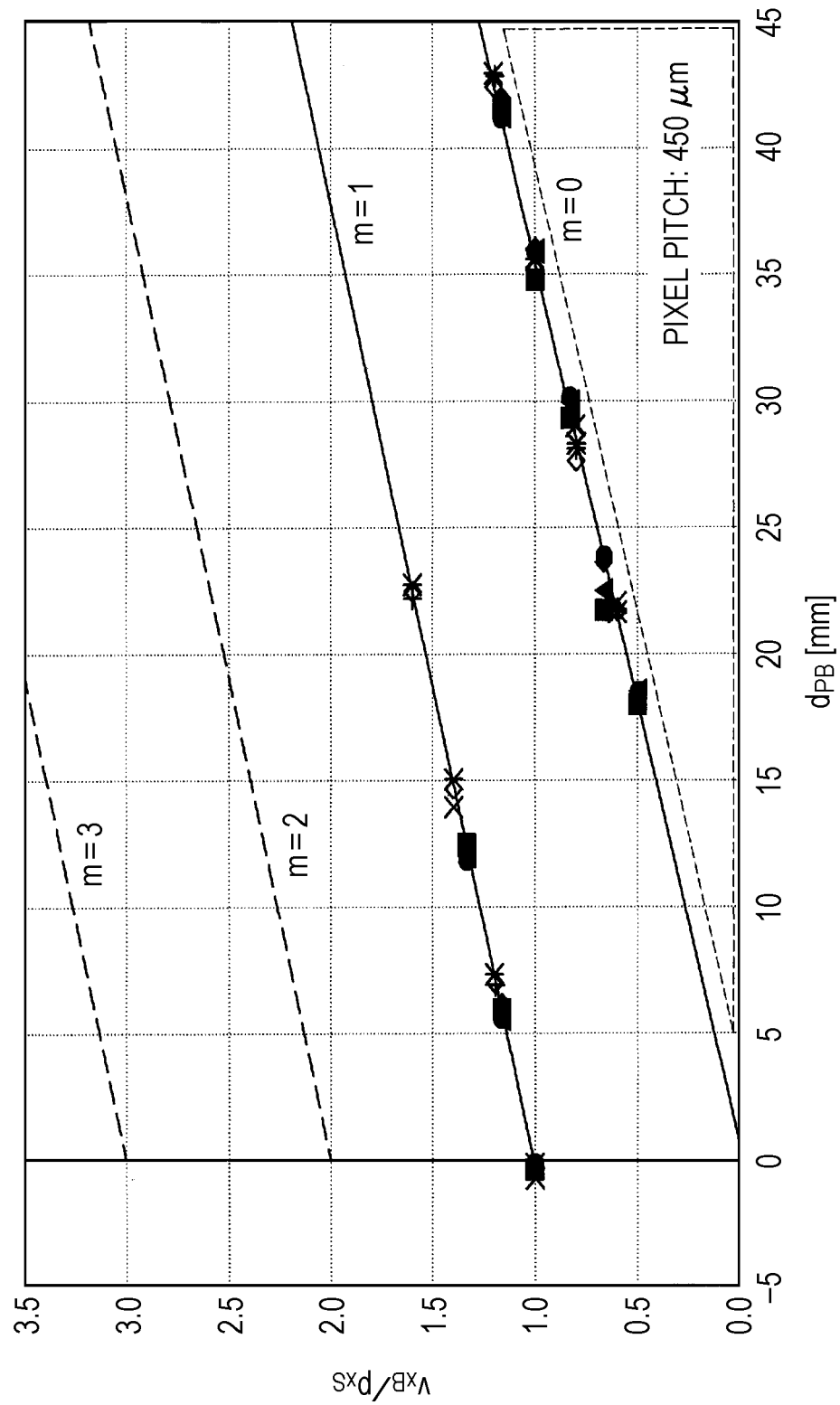
FIG. 12C is a graph illustrating the combinations of the barrier opening ratio and distance between the display and the parallax barrier in which the moire modulation degree becomes the minimum for each pixel pitch according to the first embodiment of the disclosure.

FIGS. 12A to 12C are the graphs illustrating the combinations of the barrier opening ratio $v_{xB}/P_{xS}$ and distance $d_{PB}$ between the display 110 and the parallax barrier 120 in which the moire modulation degree $f_m$ becomes the minimum for each first pixel pitch $p_{xP}$ according to the first embodiment of the disclosure.

Here, in FIGS. 12A to 12C, an approximate straight line passing through the distance $d_{PB}$ of 0 and the barrier opening ratio $v_{xB}/P_{xS}$ of m (where m=0, 1, 2, . . . ) can be obtained in the distribution of the combinations of the barrier opening ratio $v_{xB}/P_{xS}$ and distance $d_{PB}$ in which the moire modulation degree $f_m$ becomes the minimum. In FIG. 12A (first pixel pitch $p_{xP}$=225 µm), the approximate straight lines when m=0, 1, 2, and 3 are shown. In FIG. 12B (first pixel pitch $p_{xP}$=300 µm), the approximate straight lines when m=0, 1, and 2 are shown and the approximate straight line expected when m=3 is shown. In FIG. 12C (first pixel pitch $p_{xP}$=450 µm), the approximate straight lines when m=0 and 1 are shown and the approximate straight lines expected when m=2 and 3 are shown.

In the drawings, each approximate straight line is estimated to have substantially the same positive slope for each first pixel pitch $p_{xP}$. Accordingly, the relationship between the barrier opening ratio $v_{xB}/P_{xS}$ and the distance $d_{PB}$ is expressed by Expression (21) using m above.

$$\frac{v_{xB}}{p_{xS}} = \gamma \cdot d_{PB} + m \tag{21}$$

In this expression, $\gamma$ is a constant greater than 0. Further, since the width $v_{xB}$ is greater than 0 and is not greater than a multiple of the number of viewpoints N of the first sub-pixel pitch $p_{xS}$, m=0, 1, 2, . . . , (N−1).

In each drawing, since it is considered that no moire is generated in the right lower area of the straight line shown with "m=0", another condition of the barrier opening ratio $v_{xB}/P_{xS}$ and the distance $d_{PB}$ to reduce the moire is expressed by Expression (22).

$$\frac{v_{xB}}{p_{xS}} \leq \gamma \cdot d_{PB} \tag{22}$$

In this expression, $\gamma$ is the same constant as the constant $\gamma$ used in Expression (21). Here, as described above, $\gamma$ is the same slope for each first pixel pitch $p_{xP}$ and it is considered that this slope is related to the first pixel pitch $p_{xP}$. Therefore, a graph in which the value of $\gamma$ is plotted for the first pixel pitch $p_{xP}$ is shown in FIG. 13.

Figure 13:
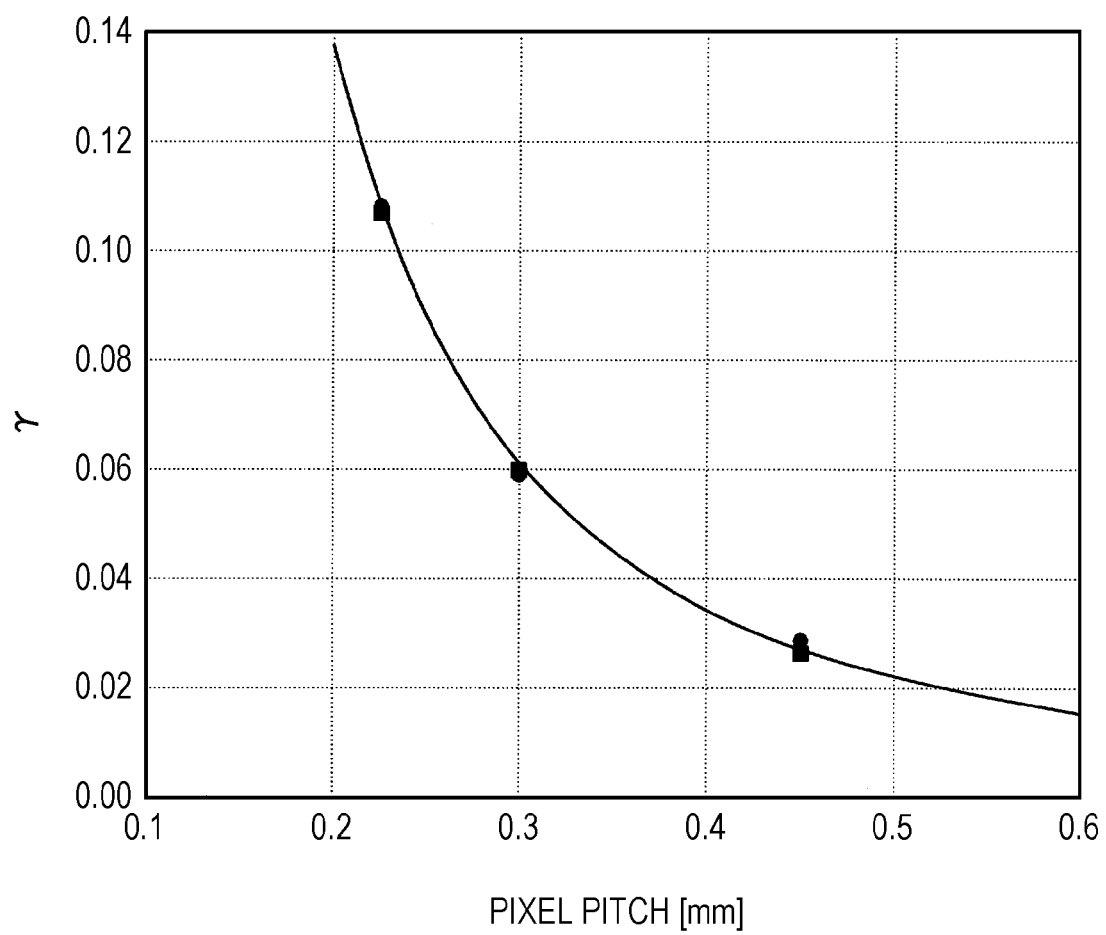
FIG. 13 is a graph illustrating a relationship between the pixel pitch and the slope of an approximate straight line of the combination of the barrier opening ratio and the distance between the display and the parallax barrier in which the moire modulation degree becomes the minimum according to the first embodiment of the disclosure.

FIG. 13 is a graph illustrating a relationship between the first pixel pitch $p_{xP}$ and the slope $\gamma$ of the approximate straight line of the combination of the barrier opening ratio $v_{xB}/P_{xS}$ and the distance $d_{PB}$ between the display 110 and the parallax barrier 120 in which the moire modulation degree $f_m$ becomes the minimum according to the first embodiment of the disclosure. As shown in FIG. 13, $\gamma$ is in inverse proportion to the square of the first pixel pitch $p_{xP}$. That is, $\gamma$ is expressed by Expression (23) using an constant $\alpha$ greater than 0.

$$\gamma = \frac{\alpha}{p_{xP}^2} \tag{23}$$

When Expression (23) is substituted into Expression (21) to modify the form of calculating the width $v_{xB}$, Expression (24) can be obtained.

$$v_{xB} = \left(\frac{\alpha}{p_{xP}^2} \cdot d_{PB} + m\right) \cdot p_{xS} \tag{24}$$

When Expression (23) is substituted into Expression (22) to modify the form of calculating the width $v_{xB}$, Expression (25) can be obtained.

$$v_{xB} \leq \left(\frac{\alpha}{p_{xP}^2} \cdot d_{PB}\right) \cdot p_{xS} \tag{25}$$

Further, when an approximate value of $\alpha$ is calculated in the graph shown in FIG. 13, 0.0055 is obtained.

As described above, the relationship among the first width $w_{xB}$, the first sub-pixel pitch $p_{xS}$, and the first pixel pitch $p_{xP}$ described above is established for the second width $w_{yB}$, the second sub-pixel pitch $p_{yS}$, and the second pixel pitch $p_{yP}$. Accordingly, in order to reduce the moire in the display apparatus 100, the condition expressed by Expression (26) or Expression (27) may be satisfied in the y-axis direction.

$$v_{yB} = \left(\frac{\alpha}{p_{yP}^2} \cdot d_{PB} + m\right) \cdot p_{yS} \tag{26}$$

$$v_{yB} \leq \left(\frac{\alpha}{p_{yP}^2} \cdot d_{PB}\right) \cdot p_{yS} \tag{27}$$

The above-described conditions to reduce the moire in the display apparatus 100 are summarized as follows.

(a)' The first width $w_{xB}$ and the first sub-pixel pitch $p_{xS}$ satisfy the relationship expressed by Expression (24) or Expression (25).

(b)' The second width $w_{yB}$ and the second sub-pixel pitch $p_{yS}$ satisfy the relationship expressed by Expression (26) or Expression (27).

(c) The first pixel opening width $w_{xP}$ is identical to the first sub-pixel pitch $p_{xS}$.

(d) The second pixel opening width $w_{yP}$ is identical to the second sub-pixel pitch $p_{yS}$.

In the actual design of the display apparatus 100, it is difficult to precisely satisfy the above-mentioned conditions due to the above-described reasons. However, by designing the display apparatus so as to approximate the above-mentioned conditions, the moire can be reduced to some extent. In this case, by designing the display apparatus so as to satisfy a number of the conditions (a)' to (d)', the moire can be further reduced.

2. Second Embodiment

Next, a second embodiment of the disclosure will be described with reference to FIGS. 14 to 16. The second embodiment of the disclosure is different from the first embodiment in the configuration of the parallax barrier 120. However, since the remaining configuration is the same as that of the first embodiment, the detailed description thereof will not be repeated.

2-1. Configuration of Display Apparatus

Figure 14:
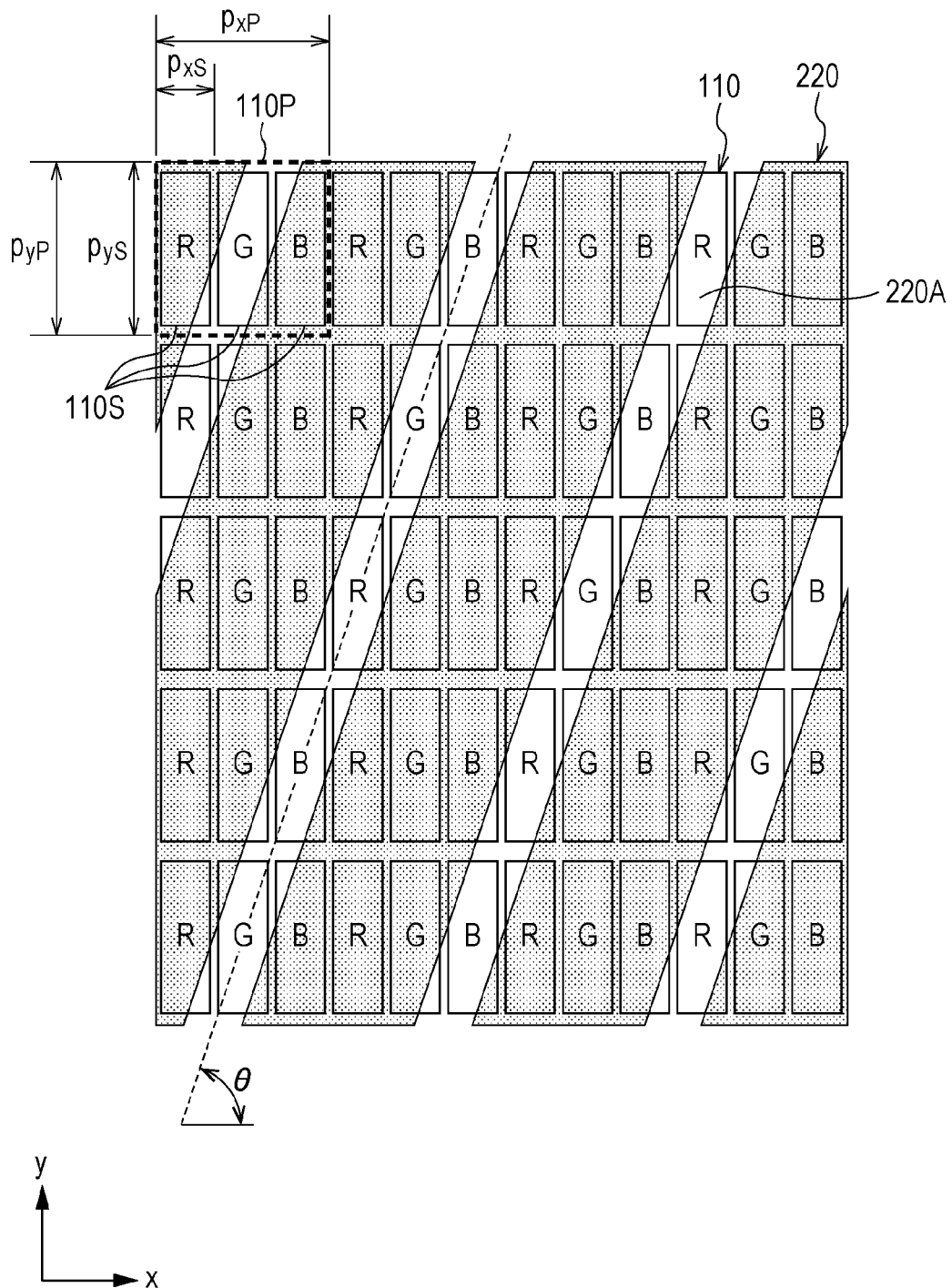
FIG. 14 is a schematic elevational view illustrating the display and the parallax barrier according to a second embodiment of the disclosure, when viewed from the side of the viewpoint.

FIG. 14 is a schematic elevational view illustrating the display 110 and the parallax barrier 220 according to the second embodiment of the disclosure, when viewed from the side of the viewpoint. In the display 110, as shown in FIG. 14, sub-pixels 110S are periodically arranged. In this embodiment, a pixel 110P is formed by three sub-pixels 110S. The number of sub-pixels of the pixel may be plural and the embodiment of the disclosure is not limited to 3. In a parallax barrier 220, transmissive sections 220A are periodically arranged. In this embodiment, the number of viewpoints N is 4.

The transmissive sections 220A are periodically arranged in the parallax barrier 220 and have a stripe shape. In the second embodiment, the parallax barrier 220 is a kind of barrier called a stripe barrier, in which the transmissive sections 220A are arranged in the inclination direction of an angle θ. The barrier pitch of the transmissive section 220A will be described below.

Figure 15:
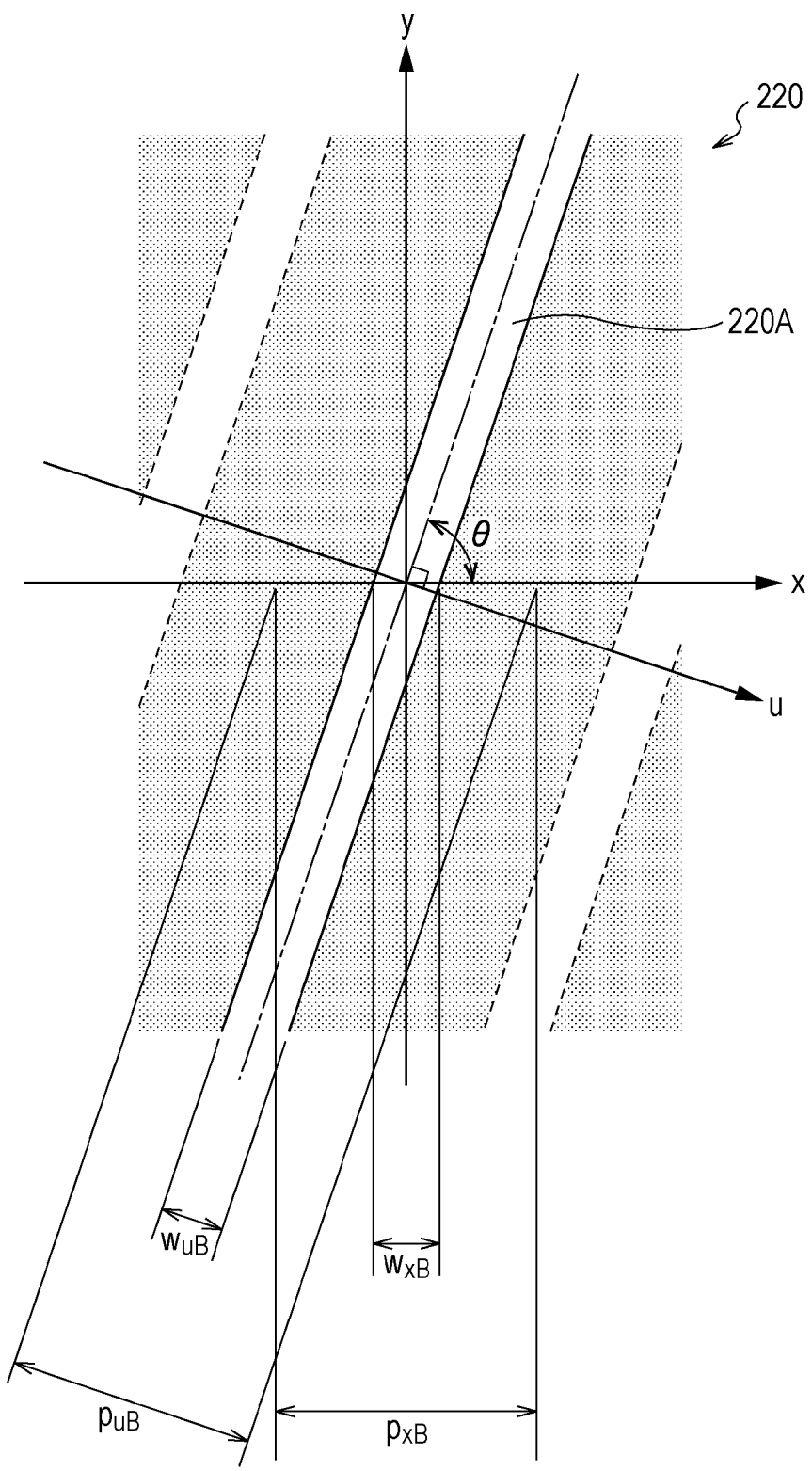
FIG. 15 is a diagram illustrating a width according to the second embodiment of the disclosure.

FIG. 15 is a diagram illustrating the transmissive section 220A according to the second embodiment of the disclosure. As shown in FIG. 15, the transmissive sections 220A are periodically arranged in the parallax barrier 220.

The transmissive section 220A has a stripe shape extending in the inclination direction of the angle θ with respect to the x axis. Here, a u axis is set in a direction perpendicular to the extension direction of the transmissive section 220A. The relationships between a distance u in the u-axis direction and the x and y axes are expressed by Expression (28).

$$x = u \cos \theta$$
$$y = u \sin \theta \tag{28}$$

The transmissive section 220A has a width $w_{uB}$ in the u-axis direction. Further, the transmissive sections 220A are arranged at a barrier pitch $p_{uB}$ in the u-axis direction. Hereinafter, the light intensity distribution in the u-axis direction in the parallax barrier 220 will be described. In the transmissive section 220A, a width $w_{xB}$ in the x-axis direction and the barrier pitch $p_{xB}$ in the x-axis direction may be defined as in Expression (29).

$$w_{xB} = w_{uB} \cos \theta$$
$$p_{xB} = p_{uB} \cos \theta \tag{29}$$

Although not illustrated, a width $w_{yB}$ in the y-axis direction and a barrier pitch $p_{yB}$ in the y-axis direction can also be defined, as in Expression (30).

$$w_{yB} = w_{uB} \sin \theta$$
$$p_{yB} = p_{uB} \sin \theta \tag{30}$$

2-2. Light Intensity Distribution in Image

As in the light intensity distribution of the parallax barrier 120 described with reference to FIG. 6 in the first embodiment, the light intensity distribution of the parallax barrier 220 has a pulse-shaped periodic structure with a period $p_{uB}$ and a width $w_{uB}$ in the u-axis direction. The light intensity observed with periodic structure is expressed as a function $f_B(u)$ for the distance u in the u-axis direction using a Fourier series, as in Expression (31). In this expression, m denotes the series order and $b_m$ denotes a Fourier coefficient.

$$f_B(u) = \sum_{m=-\infty}^{\infty} b_m \cdot \exp\left[-i2\pi \frac{m}{p_{uB}} u\right] \tag{31}$$

The light intensity observed in an image displayed by the display apparatus 100 according to the second embodiment of the disclosure is a light intensity that is formed by superimposing the light intensity in the display 110 on the light intensity in the parallax barrier 220. The light intensity formed by the superimposing is expressed by a product of the functions representing the respective light intensities. Accordingly, the light intensity distribution observed in the image is expressed by a product of the function $f_P(x,y)$ of Expression (6) representing the light intensity in the display 110 of the first embodiment and the function $f_B(u)$ of Expression (31) representing the light intensity in the parallax barrier 220, as in Expression (32).

$$f_P(x, y) \cdot f_B(u) = \sum_{m=-\infty}^{\infty} \sum_{n=-\infty}^{\infty} a_{mn} \cdot \exp\left[-i2\pi\left(\frac{m}{p_{xP}} x + \frac{n}{p_{yP}} y\right)\right] \cdot$$
$$\sum_{m=-\infty}^{\infty} b_m \cdot \exp\left[-i2\pi \frac{m}{p_{uB}} u\right]$$
$$= \sum_{m=-\infty}^{\infty} a_{mn} \cdot \exp\left[-i2\pi \frac{m}{p_{xP}} x\right] \cdot$$
$$\sum_{n=-\infty}^{\infty} a_n \cdot \exp\left[-i2\pi \frac{n}{p_{yP}} y\right] \cdot$$
$$\sum_{m=-\infty}^{\infty} b_m \cdot \exp\left[-i2\pi \frac{m}{p_{uB}} u\right] \tag{32}$$

The envelope line of the discrete spectrum of a function having a pulse-shaped periodic structure has a sinc function. Therefore, when the envelope line of the discrete spectrum is applied to the function $f_B(u)$ of Expression (31) representing the light intensity of the parallax barrier 220, a Fourier coefficient of the form of the sinc function is calculated as in Expression (33).

$$b_m = \frac{\sin\left(\frac{w_{uB}}{p_{uB}}m\pi\right)}{m\pi} \quad (33)$$

2-3. Cause to Generation of Moire

Here, the light intensity distribution of the parallax barrier 220 has a discrete spectrum of an interval of $1/p_{uB}$ in the u-axis direction. The light intensity distribution is decomposed in the x-axis and y-axis directions in the consideration of the superimposition with the light intensity distribution of the display 110. The light intensity distribution of the parallax barrier 220 in the x-axis direction has a discrete spectrum with an interval of $1/p_{uB}\cos\theta$ from Expression (29).

As described with reference to FIG. 8 in the first embodiment, there is a high possibility of the moire being generated in the frequency component commonly contained in the light intensity distributions of the display 110 and the parallax barrier 220. This condition is expressed for the x-axis direction by Expression (34) by the use of Expression (3).

$$\frac{N}{p_{uB}\cos\theta} = \frac{3}{p_{xP}} \quad (34)$$

This condition is expressed for the y-axis direction by Expression (35) by the use of Expression (4).

$$\frac{N}{p_{uB}\sin\theta} = \frac{1}{p_{yP}} \quad (35)$$

In this expression, on the assumption that $p_{xS}$ is the first sub-pixel pitch in the x-axis direction and $p_{yS}$ is the second sub-pixel pitch in the y-axis direction, the sub-pixel pitch $p_{uS}$ in the u-axis direction is defined as in Expression (36).

$$p_{uS} = \frac{p_{xS}}{\cos\theta} = \frac{p_{yS}}{\sin\theta} \quad (36)$$

When Expression (34) and Expression (35) are summarized in the u-axis direction using Expression (36), the condition that the moire is generated in the observed image is expressed by Expression (37) on the assumption that s is any integer.

$$s\frac{N}{p_{uB}} = s\frac{1}{p_{uS}} \quad (37)$$

In this embodiment, N is 4 in Expression (34), Expression (35), and Expression (37), as described above.

FIG. 16 is a diagram illustrating a combination of the frequencies of the light intensities in the x-axis direction, which is the first direction, and y-axis direction, which is the second direction, according to the second embodiment of the disclosure. As shown in FIG. 16, the combination of the space frequencies of the light intensity distribution of the display 110 and the light intensity distribution of the parallax barrier 220 in the x-axis and y-axis directions is plotted.

The frequency distribution shown here is a frequency distribution formed by combining the frequency distributions described with reference to FIG. 8 in the first embodiment in the x-axis and y-axis directions from Expression (34), Expression (35), and Expression (37). Accordingly, the combination of the frequency components commonly contained in the light intensity distribution of the display 110 and the light intensity distribution of the parallax barrier 220 in the x-axis and y-axis directions is shown as a combination of the frequency components in which the beat occurs. Here, the frequency at which the beat (moire) occurs appears at an equal interval in the xy space due to the periodicity of the light intensity distribution of the display 110 and the periodicity of the light intensity distribution of the parallax barrier 220.

2-4. Design for Reducing Moire

As expressed in Expression (32), the light intensity observed in the image is expressed by the product of the light intensity of the display 110 and the light intensity of the parallax barrier 220. Accordingly, when one of the light intensities approaches 0 in the combination of the frequency components at which the moire is generated, it is possible to reduce the moire.

First, when the Fourier coefficient expressed by Expression (33) becomes 0 in the light intensity distribution of the parallax barrier 220, the light intensity (amplitude) of the frequency at which the moire is generated can be made to approach 0, thereby preventing the moire from being generated. The condition that the Fourier coefficient becomes 0 is expressed by Expression (38), when j is any integer.

$$\frac{\sin\left(\frac{w_{uB}}{p_{uB}}j\pi\right)}{j\pi} = 0 \quad (38)$$

The above condition is expressed by Expression (39) for the u-axis direction. In this expression, the width $w_{uB}$ is not greater than the barrier pitch $p_{uB}$; j is 1, 2, . . . , N. That is, j is a natural number equal to or less than the number of viewpoints N.

$$\frac{p_{uB}}{p_{uS}} = j \quad (39)$$

When the condition expressed by Expression (15) for the display 110 and Expression (39) for the parallax barrier 220 is summarized, one of the following conditions may be satisfied in order to reduce the moire observed in the image displayed by the display apparatus 100.

(a) A ratio of the width $w_{uB}$ to the sub-pixel pitch $P_{uS}$ is a natural number equal to or less than N.

(b) The first pixel opening width $w_{xP}$ is identical to the first sub-pixel pitch $p_{xS}$.

(c) The second pixel opening width $w_{yP}$ is identical to the second sub-pixel pitch $p_{yS}$.

In the actual design of the display apparatus 100, it is difficult to precisely satisfy the above-mentioned conditions since there is a necessity to form a space for a driving circuit between the sub-pixels 110S. However, by designing the display apparatus so as to approximate the above-mentioned conditions, the moire can be reduced to some extent. In this case, by designing the display apparatus so as to satisfy a number of the conditions (a) to (c), the product of three Fourier coefficients shown in Expression (32) has a smaller value, thereby further reducing the moire.

Distance between Display and Parallax Barrier

In this embodiment, as in the first embodiment, the moire may not necessarily be reduced even when the above-mentioned conditions are satisfied. Accordingly, when the experimental result of the distance between the display and the parallax barrier in the first embodiment is applied to the u-axis direction in this embodiment, the condition expressed by Expression (40) or Expression (41) can be obtained. In this expression, $p_{uP}$ is the pixel pitch in the u-axis direction and a relationship "$p_{uP}=p_{xP}/\cos\theta$" is satisfied.

$$v_{uB} = \left(\frac{\alpha}{p_{uP}^2} \cdot d_{PB} + m\right) \cdot p_{uS} \quad (40)$$

$$v_{uB} \leq \left(\frac{\alpha}{p_{uP}^2} \cdot d_{PB}\right) \cdot p_{uS} \quad (41)$$

The above-described conditions to reduce the moire in the display apparatus 100 are summarized are as follows.

(a)' The width $w_{uB}$, and the sub-pixel pitch $p_{uS}$ satisfy the relationship expressed by Expression (40) or Expression (41).

(b) The first pixel opening width $w_{xP}$ is identical to the first sub-pixel pitch $p_{xS}$.

(c) The second pixel opening width $w_{yP}$ is identical to the second sub-pixel pitch $p_{yS}$.

In the actual design of the display apparatus 100, it is difficult to precisely satisfy the above-mentioned conditions due to the above-described reasons. However, by designing the display apparatus so as to approximate the above-mentioned conditions, the moire can be reduced to some extent. In this case, by designing the display apparatus so as to satisfy a number of the conditions (a)' to (c), the moire can be further reduced.

3. Supplement

The preferred embodiments of the disclosure have hitherto been described with reference to the accompanying drawings, but the disclosure is not limited to the embodiments. It should be apparent to those skilled in the art that various modifications and alterations may occur within the scope of the appended claims or the equivalents thereof and it should be understood that the modifications and alterations, of course, pertain to the technical scope of the disclosure.

The present disclosure contains subject matter related to that disclosed in Japanese Priority Patent Application JP 2010-196817 filed in the Japan Patent Office on Sep. 2, 2010, the entire contents of which are hereby incorporated by reference.

What is claimed is:

1. A display apparatus comprising:
   a display unit in which sub-pixels are periodically arranged at a first sub-pixel pitch in a first direction of a screen, each pixel is formed by a plurality of sub-pixels, the pixels are periodically arranged at a first pixel pitch in the first direction, and a plurality of viewpoint images is displayed on a display surface; and
   a barrier unit in which transmissive sections having a first width in the first direction are periodically arranged,
   wherein $P_{S1}$ is the first sub-pixel pitch, $P_{P1}$ is the first pixel pitch, $d_{PB}$ is a distance between the display surface of the display unit and the barrier section, and $\alpha$ and m are constants having values greater than 0, wherein m is an integer between 1 and N−1, inclusive, wherein N is a number of the plurality of viewpoint images, and the first width $w_{B1}$ is expressed by a following expression:

$$w_{B1} = \left(\frac{\alpha}{p_{P1}^2} \cdot d_{PB} + m\right) \cdot p_{S1}.$$

2. The display apparatus according to claim 1, wherein the barrier section is disposed in front of the display surface of the display unit.

3. The display apparatus according to claim 1, further comprising:
   a light source,
   wherein the barrier section is disposed between the light source and the display unit.

4. The display apparatus according to claim 1, wherein a value of the constant $\alpha$ is 0.0055.

5. The display apparatus according to claim 1,
   wherein the barrier section is an inclined stripe barrier, and
   wherein the first direction is perpendicular to an opening direction of the inclined stripe barrier.

6. The display apparatus according to claim 1,
   wherein the sub-pixels are periodically arranged at a second sub-pixel pitch in a second direction of the screen,
   wherein the pixels are periodically arranged at a second pixel pitch in the second direction,
   wherein the transmissive section has a second width in the second direction, and
   wherein $p_{S2}$ is the second sub-pixel pitch, $P_{P2}$ is the second pixel pitch, $d_{PB}$ is a distance between the display surface of the display unit and the barrier section, $\beta$ and n are constants having values greater than 0, wherein n is an integer between 1 and N−1, inclusive, wherein N is the number of the plurality of viewpoint images, and the second width $w_{B2}$ is expressed by a following expression;

$$w_{B2} = \left(\frac{\beta}{p_{P2}^2} \cdot d_{PB} + n\right) \cdot p_{S2}.$$

7. The display apparatus according to claim 1,
   wherein the sub-pixels are periodically arranged at a second sub-pixel pitch in a second direction of the screen,
   wherein the pixels are periodically arranged at a second pixel pitch in the second direction,
   wherein the transmissive section has a second width in the second direction, and
   wherein $P_{S2}$ is the second sub-pixel pitch, $P_{P2}$ is the second pixel pitch, $d_{PB}$ is a distance between the display surface of the display unit and the barrier section, $\beta$ is a constant having a value greater than 0, and the second width $w_{B2}$ is set in accordance with a following expression;

$$w_{B2} \leq \frac{\beta}{p_{P2}^2} \cdot d_{PB} \cdot p_{S2}.$$

8. The display apparatus according to claim 6, wherein a value of the constant $\beta$ is 0.0055.

9. The display apparatus according to claim 6,
   wherein the first direction is a horizontal direction of the screen,
   wherein the second direction is a vertical direction of the screen, and
   wherein the barrier unit is a step barrier in which the transmissive sections are arranged in a step shape.

10. The display apparatus according to claim 1,
wherein a pixel opening section, which is an opening section of one of the plurality of sub-pixels that forms each pixel, has a first pixel opening width in the first direction, and
wherein the first pixel opening width is set to approximate the first sub-pixel pitch.

11. The display apparatus according to claim 1,
wherein a pixel opening section, which is an opening section of one of the plurality of sub-pixels that forms each pixel, has a second pixel opening width in a second direction,
wherein the sub-pixels are periodically arranged at a second sub-pixel pitch in the second direction, and
wherein the second pixel opening width is set to approximate the second sub-pixel pitch.

12. A display apparatus comprising:
a display unit in which sub-pixels are periodically arranged at a first sub-pixel pitch in a first direction of a screen, each pixel is formed by a plurality of sub-pixels, the pixels are periodically arranged at a first pixel pitch in the first direction, and a plurality of viewpoint images is displayed on a display surface; and
a barrier unit in which transmissive sections having a first width in the first direction are periodically arranged,
wherein $P_{S1}$ is the first sub-pixel pitch, $P_{P1}$ is the first pixel pitch, $d_{PB}$ is a distance between the display surface of the display unit and the barrier section, $\alpha$ is a constant greater than 0, and the first width $w_{B1}$ is set in accordance with a following expression;

$$w_{B1} \leq \frac{\alpha}{p_{P1}^2} \cdot d_{PB} \cdot p_{S1}.$$

* * * * *